(12) United States Patent
Dudar

(10) Patent No.: US 11,104,222 B2
(45) Date of Patent: Aug. 31, 2021

(54) SYSTEMS AND METHODS FOR VEHICLE MULTI-CANISTER EVAPORATIVE EMISSIONS SYSTEMS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 36 days.

(21) Appl. No.: 16/419,682

(22) Filed: May 22, 2019

(65) Prior Publication Data
US 2020/0369508 A1 Nov. 26, 2020

(51) Int. Cl.
| | | |
|---|---|---|
| B60K 15/035 | (2006.01) | |
| B67D 7/36 | (2010.01) | |
| B67D 7/32 | (2010.01) | |
| F02M 25/08 | (2006.01) | |

(52) U.S. Cl.
CPC .......... *B60K 15/03504* (2013.01); *B67D 7/32* (2013.01); *B67D 7/36* (2013.01); *F02M 25/0872* (2013.01)

(58) Field of Classification Search
CPC .... B67D 7/32; B67D 7/36; F02M 25/08–089; B60K 15/03504; B60K 2015/03514
See application file for complete search history.

(56) References Cited

U.S. PATENT DOCUMENTS

| | | | |
|---|---|---|---|
| 5,806,500 A | 9/1998 | Fargo et al. | |
| 9,732,685 B2 | 8/2017 | Dudar | |
| 9,797,809 B2* | 10/2017 | Dudar ................ | F02M 25/0809 |
| 2011/0168140 A1* | 7/2011 | DeBastos ........... | F02M 25/0818 |
| | | | 123/521 |
| 2012/0204720 A1 | 8/2012 | Tschantz et al. | |
| 2015/0142293 A1* | 5/2015 | Dudar ................ | F02M 25/0836 |
| | | | 701/101 |
| 2016/0082832 A1* | 3/2016 | Dudar ................... | G01M 3/025 |
| | | | 206/459.1 |
| 2017/0008390 A1* | 1/2017 | Dudar ................... | F02D 41/003 |
| 2020/0102203 A1* | 4/2020 | Dudar ..................... | B67D 7/36 |
| 2020/0256286 A1* | 8/2020 | Asanuma ........... | F02M 25/0836 |
| 2020/0355135 A1* | 11/2020 | Yoshioka ........... | F02M 25/0854 |

OTHER PUBLICATIONS

Dudar, A., "Systems and Methods for Vehicle Multi-Canister Evaporative Emissions Systems," U.S. Appl. No. 16/419,764, filed May 22, 2019, 86 pages.

* cited by examiner

*Primary Examiner* — Andrew D St. Clair
(74) *Attorney, Agent, or Firm* — Geoffrey Brumbaugh; McCoy Russell LLP

(57) ABSTRACT

Methods and systems are provided for pinpointing a restriction in a vehicle evaporative emissions system which may adversely impact refueling and/or fuel vapor canister purging operations. In one example a method comprises conducting a diagnostic to identify a location of a restriction based on a rise time at which a pressure in a fuel system of a vehicle rises to a threshold pressure during a refueling event where fuel is added to the fuel system. In this way, a location of the restriction may be identified so as to enable appropriate mitigating action to be taken.

13 Claims, 8 Drawing Sheets

SYSTEMS AND METHODS FOR VEHICLE MULTI-CANISTER EVAPORATIVE EMISSIONS SYSTEMS

FIELD

The present description relates generally to methods and systems for controlling loading and purging of one or more fuel vapor storage canisters included in a multi-canister evaporative emissions system of a vehicle.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

As evaporative emissions standards increasingly become stricter, vehicle systems may be configured with a plurality of canisters in series. As the canisters in series become loaded with fuel vapor, the flow of fuel vapor or air through a loaded canister may become increasingly restricted. Accordingly, during a refueling event, the increased restriction to fuel vapor flow due to one or more saturated fuel vapor canisters may lead to premature shutoffs of a refueling dispenser that is adding fuel to a fuel tank. Canister degradation over time may also lead to fluid flow restriction, which may adversely impact refueling and/or canister purging operations. For example, for multi-canister evaporative emissions system configured in series there may be a number of potential locations where restrictions may develop over time, which may impede fluid flow for refueling and/or canister purging operations. For example, canister degradation that may lead to fluid flow restriction may include accumulation of dust or debris inside a canister, liquid fouling of activated carbon included in a canister, etc. Other potential locations for restrictions include evaporative emissions system valves which may become stuck at least partially closed over time.

U.S. Pat. No. 9,732,685 discloses systems and methods for bypassing fuel vapor storage canisters that are loaded with fuel vapor during a refueling event, in order to reduce or avoid premature shutoff events which may otherwise occur. Specifically, U.S. Pat. No. 9,732,685 discloses bypass valves which are selectively electronically coupled to thermistors positioned within the canisters. In response to a thermistor recording a temperature greater than a threshold during a refueling event, indicative of saturation of the associated canister, a circuit is completed which thus commands open a bypass valve, thereby bypassing a loaded canister.

However, the inventors herein have recognized potential issues with such methodology. For example, because the bypass valves are not actively controllable, it may not be possible to bypass a canister with a restriction due to canister degradation under circumstances where the canister is not fully loaded during a refueling event, and/or during canister purging operations.

Thus, the inventors herein have recognized the above-mentioned issues, and have developed systems and methods to at least partially address them. In one example, a method comprises conducting an evaporative emissions system diagnostic to identify a location of degradation in an evaporative emissions system of a vehicle based on a rise time at which a pressure in a fuel system of the vehicle rises to a threshold pressure during a refueling event where fuel is added to the fuel system via a refueling dispenser. The degradation may comprise a restriction in the evaporative emissions system, and the location of the restriction may be correlated to the rise time. The method may include taking mitigating actions to bypass the restriction during a refueling and/or a canister purging event by controlling one or more bypass valves included in the evaporative emissions systems. In this way, refueling operations and/or canister purging operations may be efficiently conducted even in cases where a restriction in the evaporative emissions system is identified.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods pertaining to conducting refueling and fuel vapor storage canister purging operations. The systems and methods discussed herein are applicable to hybrid electric vehicles, such as the vehicle propulsion system depicted at FIG. 1. However, the systems and methods discussed herein may apply to non-hybrid vehicles without departing from the scope of this disclosure. The refueling and canister purging operations are discussed with regard to a fuel system and evaporative emissions system such as that depicted at FIG. 2. FIG.

Figure 3A:
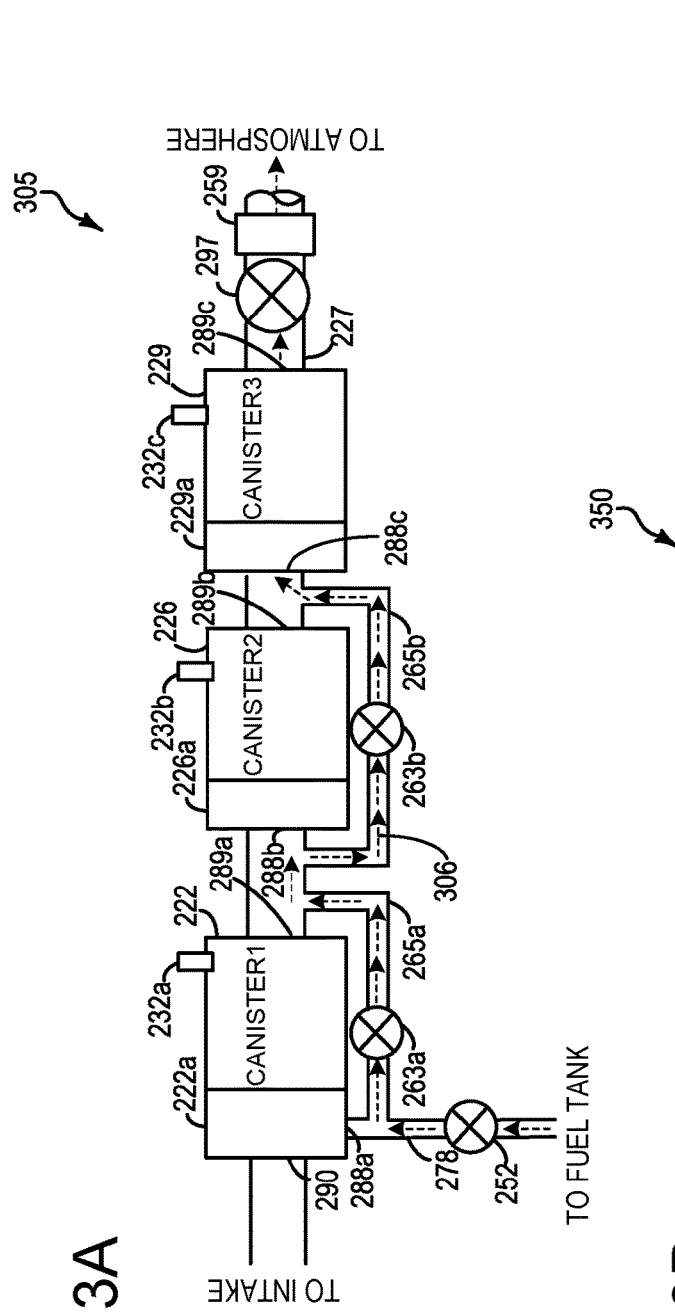
FIG. 3A schematically shows an example evaporative emissions system during a refueling operation with three fuel vapor canisters arranged in series, and with a first bypass valve and a second bypass valve opened.
Figure 3B:
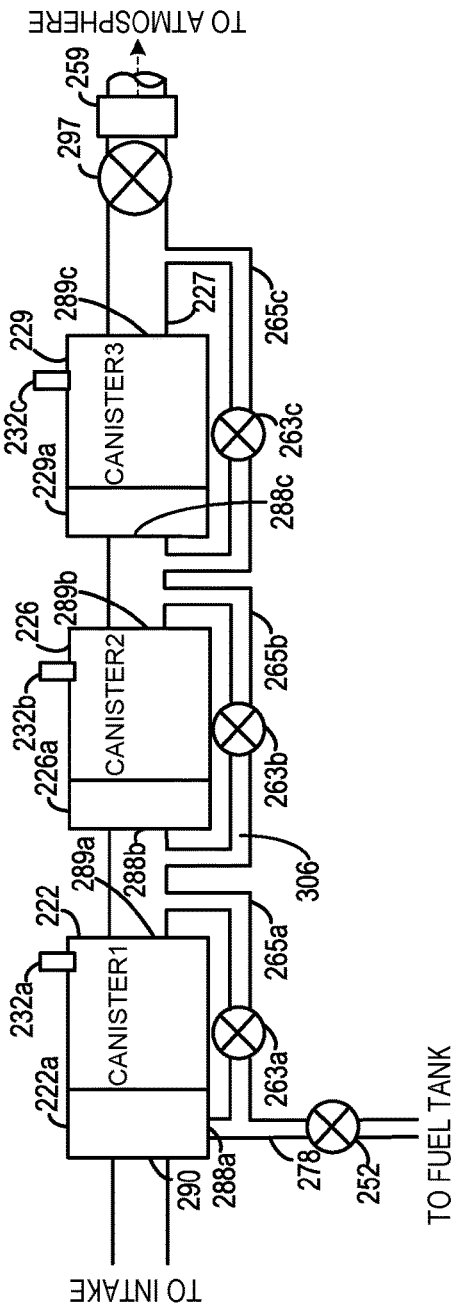
FIG. 3B depicts an example embodiment of a multi-canister evaporative emissions system with three canisters and three bypass valves.
Figure 4:
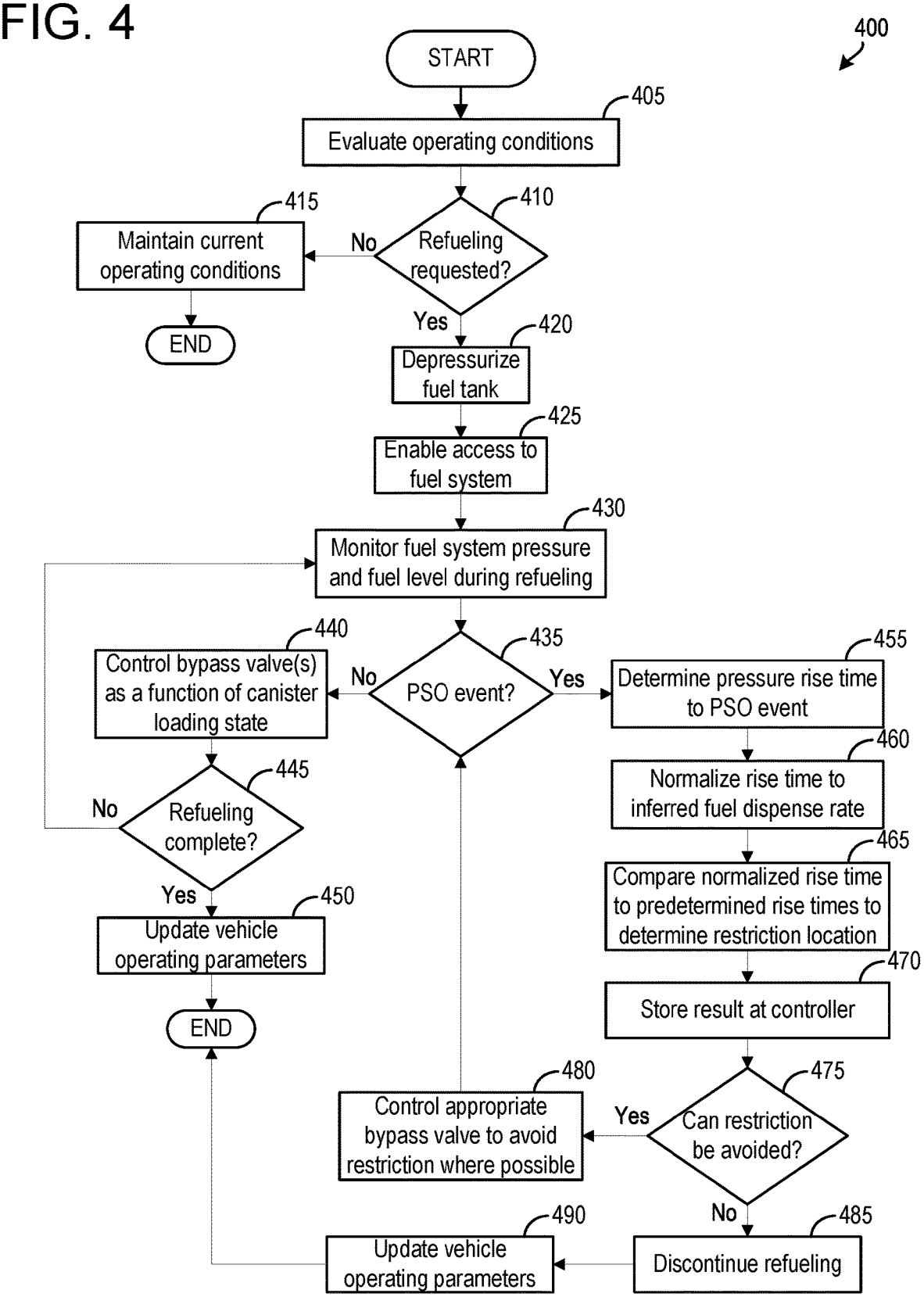
FIG. 4 depicts a high-level example method for identifying the location of a restriction in a multi-canister evaporative emissions system during a refueling event.
Figure 5:
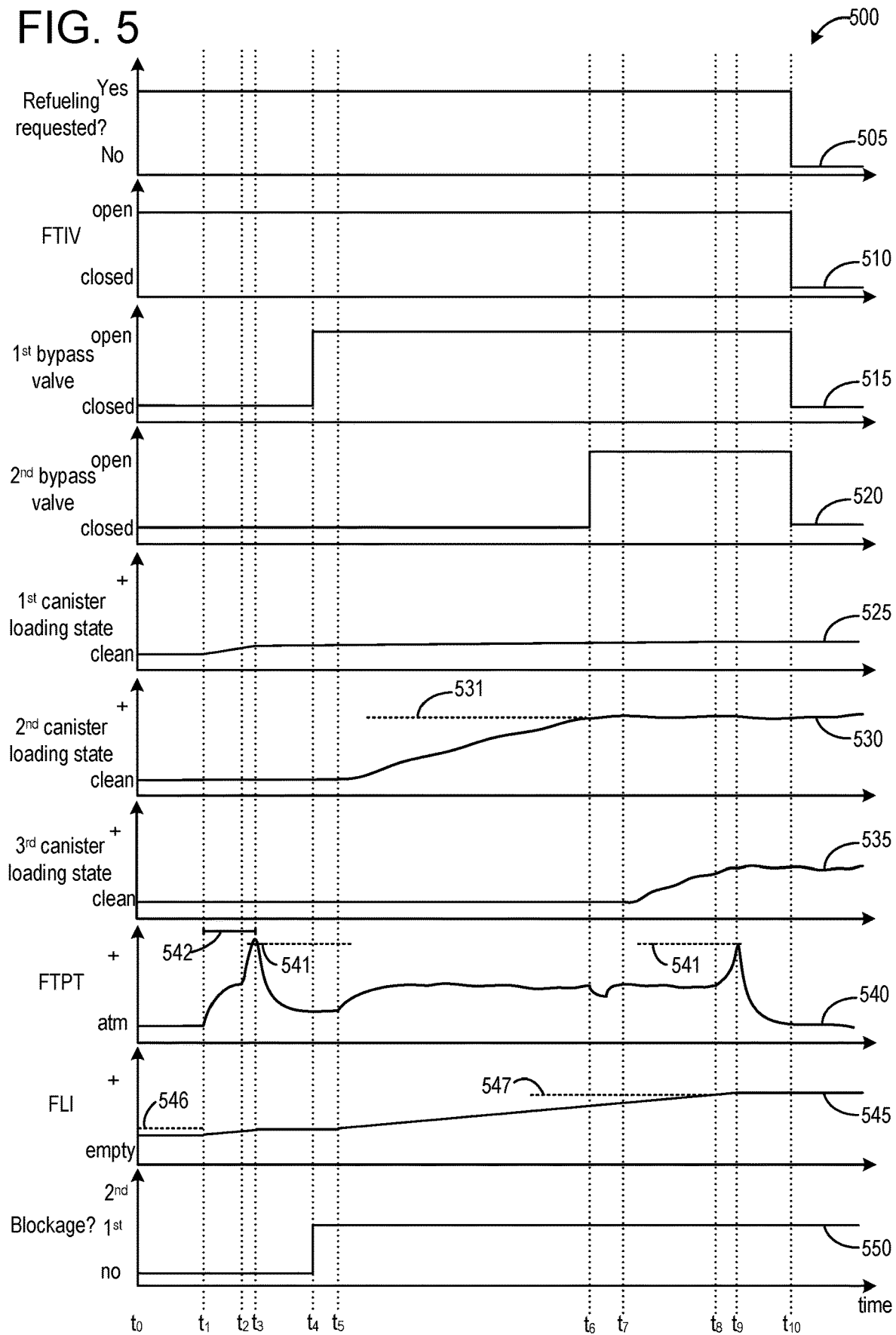
FIG. 5 depicts a timeline for conducting the method of FIG. 4.
Figure 6:
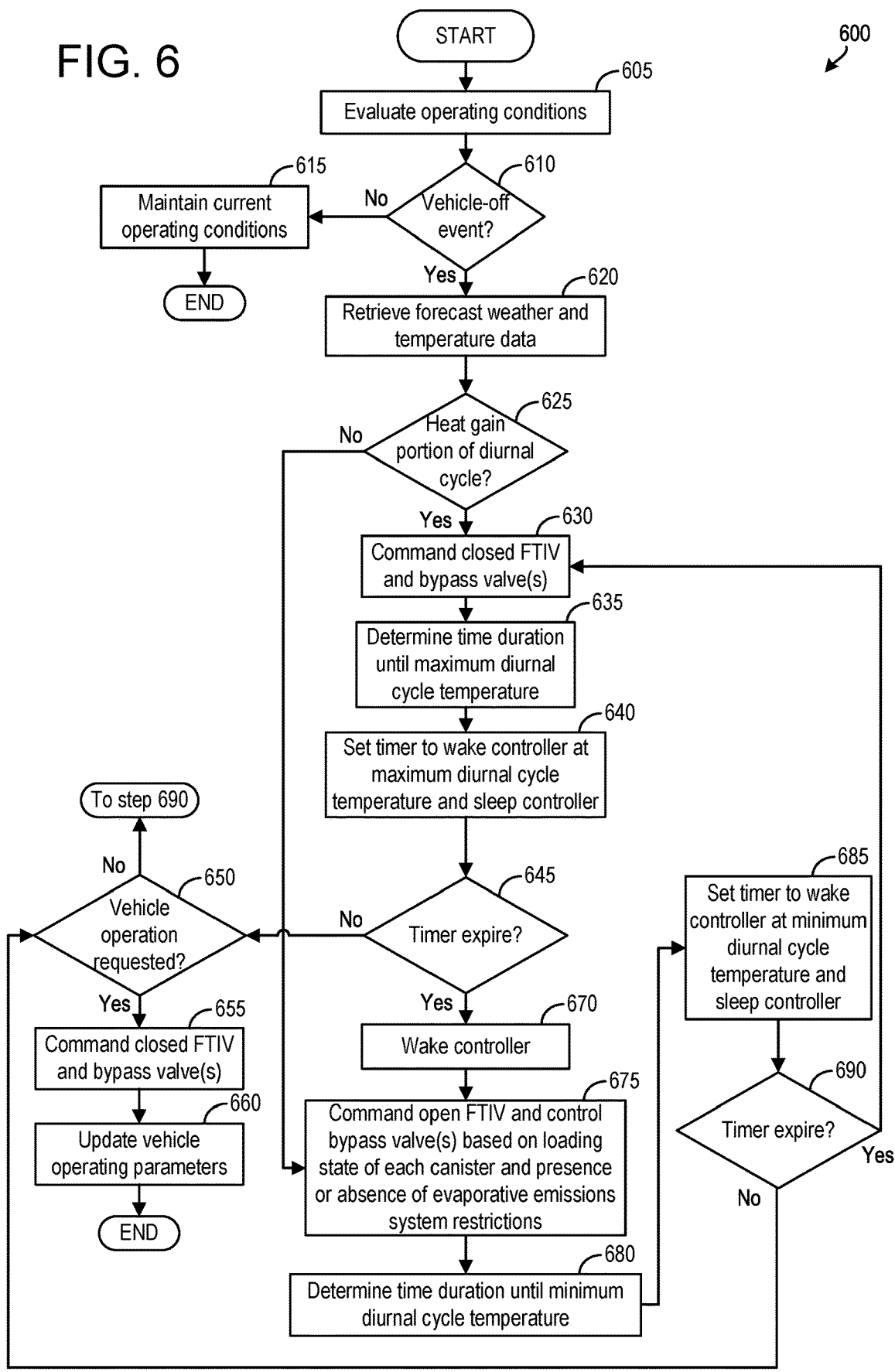
FIG. 6 depicts a high-level example method for controlling back purging operations in a multi-canister evaporative emissions system.
Figure 7:
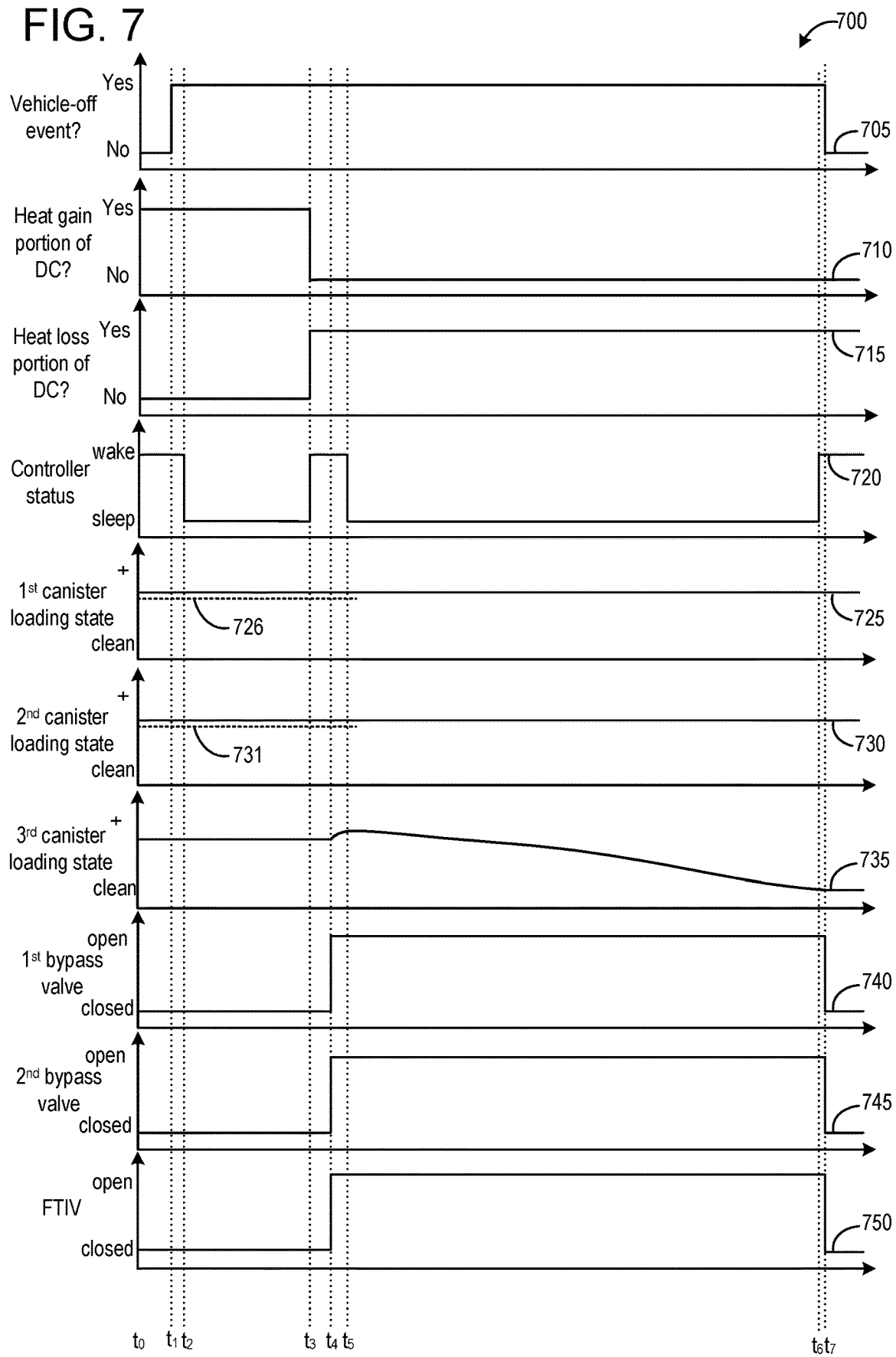
FIG. 7 depicts a timeline for conducting the method of FIG. 6.
Figure 8:
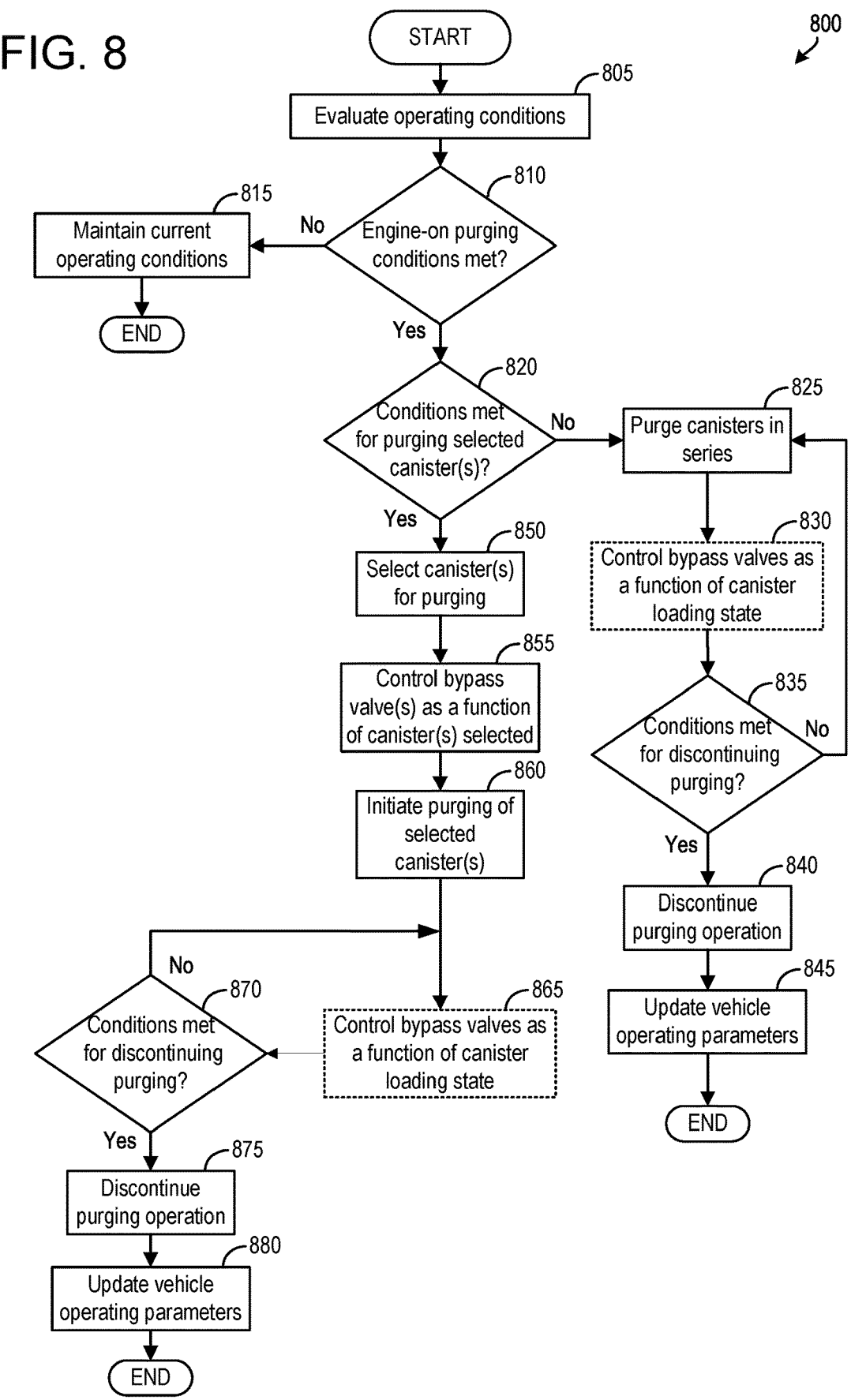
FIG. 8 depicts a high-level example method for controlling engine-on purging operations in a multi-canister evaporative emissions system.

2 depicts an evaporative emissions system with two fuel vapor storage canisters configured in series, however the systems and methods discussed herein may apply to evaporative emissions systems with more than two fuel vapor storage canisters, such as the evaporative emissions systems depicted at FIGS. 3A-3B. For multi-canister evaporative emissions systems, there may be a number of potential locations where restrictions may develop over time, which may impede fluid flow for refueling and/or canister purging operations. The method of FIG. 4 illustrates a control strategy which may be used during a refueling event to pinpoint a location of a restriction in a multi-canister evaporative emissions system. An example timeline for inferring the location of a restriction during a refueling event according to the method of FIG. 4, is depicted at FIG. 5. By identifying a location of a restriction, mitigating actions may be taken in some examples to avoid or bypass the restriction for refueling and/or canister purging operations. Accordingly, turning to FIG. 6, a method is shown for controlling canister bypass valves in order to effectively back purge fuel vapors stored in one or more fuel vapors storage canisters to a fuel tank under conditions of negative pressure in the fuel tank. In some examples, the canister bypass valves may be controlled based on an indication of a restriction. Additionally or alternatively the canister bypass valves may be controlled based on individual loading state of each canister of a multi-canister evaporative emissions system according to FIG. 6. An example timeline for conducting the methodology of FIG. 6 is depicted at FIG. 7. Similar methodology as that depicted at FIG. 6 for controlling back purging operations may be used for engine-on purging operations, as depicted by the methodology of FIG. 8.

Figure 1:
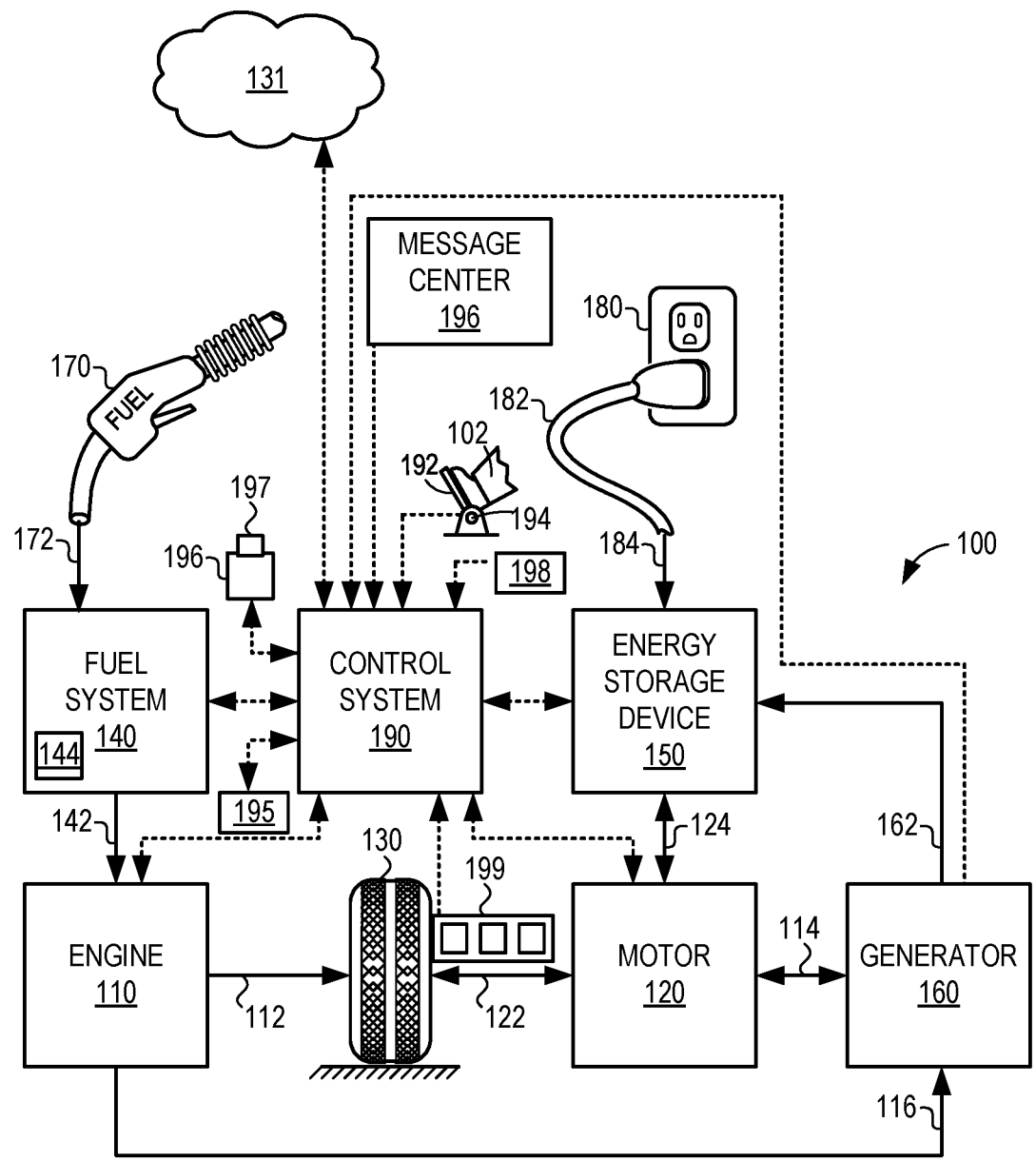
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

In some examples, vehicle propulsion system 100 may include an onboard navigation system 195 (for example a Global Positioning System) that an operator of the vehicle may interact with. The navigation system 195 may include one or more location sensors for assisting in estimating vehicle speed, vehicle altitude, vehicle position/location, etc. This information may be used to infer engine operating parameters, such as local barometric pressure, an engine idle event, etc. Control system 190 may in some examples further be configured to receive information via the internet or other communication networks. Information received from the GPS may be cross-referenced to information available via the internet to determine local weather conditions, local vehicle regulations, traffic information, etc.

Control system 190 may in some examples be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Figure 2:
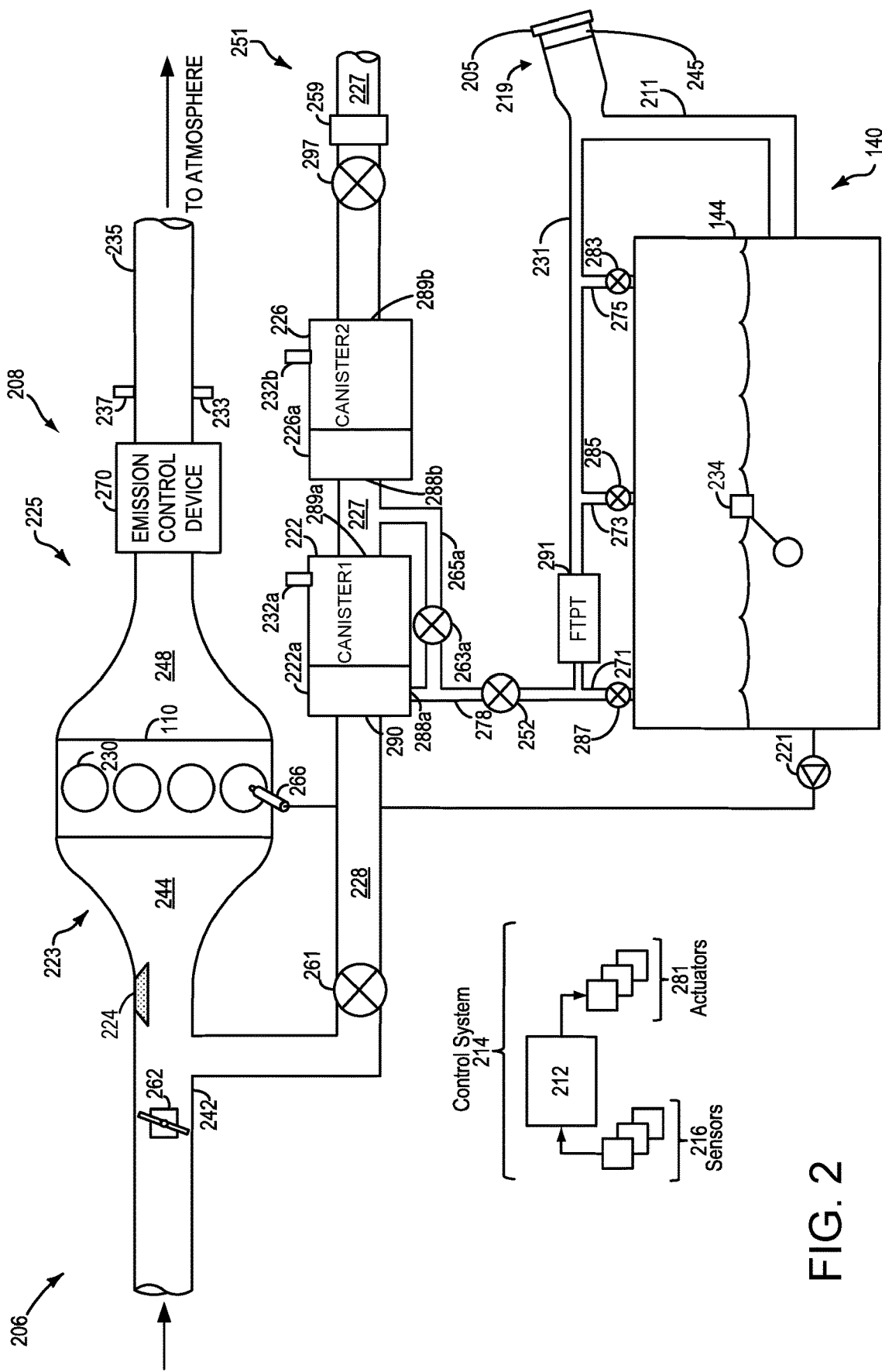
FIG. 2 schematically shows an example vehicle system with a fuel system and an evaporative emissions system.

FIG. 2 shows a schematic depiction of a vehicle system 206. The vehicle system 206 includes an engine system 208 coupled to an emissions control system 251 and a fuel system 140. It may be understood that vehicle system 206 may be included in vehicle propulsion system 100. Emission control system 251 includes a plurality of fuel vapor containers or canisters (e.g., first fuel vapor canister 222 and second fuel vapor canister 226) which may be used to capture and store fuel vapors. In some examples, vehicle system 206 may be a hybrid electric vehicle system.

The engine system 208 may include engine 110 having a plurality of cylinders 230. The engine 110 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst(s) 270, also referred to herein as emission control devices, which may be mounted in a close-coupled position in the exhaust. The one or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 110 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational, causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 110 is shut down.

Fuel system 140 may include fuel tank 144 coupled to a fuel pump system 221. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 140 may be a return-less fuel system, a return fuel system, or various other types of fuel system. Fuel tank 144 may hold a plurality of fuel blends, including fuel with a range of alcohol concentrations, such as various gasoline-ethanol blends, including E10, E85, gasoline, etc., and combinations thereof. A fuel level sensor 234 located in fuel tank 144 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 140 may be routed to an evaporative emissions control system 251, which includes one or more serially arranged fuel vapor canisters (e.g., first fuel vapor canister 222 and second fuel vapor canister 226), via vapor recovery line 231, before being purged to the engine intake 223. Vapor recovery line 231 may be coupled to fuel tank 144 via one or more conduits and may include one or more valves for isolating the fuel tank during certain conditions. For example, vapor recovery line 231 may be coupled to fuel tank 144 via one or more or a combination of conduits 271, 273, and 275.

Further, in some examples, one or more fuel tank vent valves may be included in conduits 271, 273, or 275. Among other functions, the fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 144 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters (e.g., first fuel vapor canister 222; second fuel vapor canister 226), each filled with an appropriate adsorbent. A first fuel vapor canister (e.g., 222) may include a load port 288a, a vent port 289a, and a purge port 290. A second fuel vapor canister (e.g., 226) man include a load/purge port 288b, and a vent port 289b. The canisters may be configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the one or more canisters (e.g., first vapor canister 222; second fuel vapor canister 226) to the atmosphere when storing, or trapping, fuel vapors from fuel system 218.

In some examples, emissions control system 251 may include one or more bypass conduits for bypassing one or more canisters of the multi-canister system. Each bypass conduit may be arranged to bypass at least one canister. For example, a first bypass conduit 265a, with a first bypass valve 263a may be configured such that, when open, fuel tank vapors may be routed to the second fuel vapor canister 226 from fuel tank 144 while bypassing the first fuel vapor canister 222. In other words, the first bypass valve may be configured to couple and uncouple the routing of fuel tank vapors to the second fuel vapor canister. The first bypass conduit 265a may be coupled at one end to a fuel vapor conduit 278, and may couple at the other end to vent line 227 (e.g., first segment of vent line 227) at a point between first fuel vapor canister 222 and second fuel vapor canister 226.

Bypass valve 263*a* may be controlled via commands from the controller 212. Discussed herein, bypass valve 263*a* (and other similar bypass valves in the case of more than two canisters) may comprise a bistable latchable valve, latchable in both a closed configuration and an open configuration. For example, a 100 ms pulse command sent to an actuator (not shown) of the bypass valve may result in the bypass valve opening, at which point it may be latched in the open position or configuration. In response to another 100 ms pulse, for example, the bypass valve may be commanded closed, at which point it may be latched in the closed position or configuration. By enabling the bypass valve to be latched in the open and closed position, electrical energy consumption for maintaining the bypass valve either open or closed may be lowered, and may enable the controller to go to sleep once the valve is energized to its desired state.

As fuel vapor is adsorbed by the adsorbent in the canister, heat is generated (in particular, heat of adsorption), and likewise, as fuel vapor is desorbed by the adsorbent in the canister, heat is consumed. Thus the adsorption and desorption of fuel vapor by the canister may be monitored and estimated based on temperature changes within the canister. Accordingly, depicted is a first canister temperature sensor 232*a* positioned in canister 222, and a second canister temperature sensor 232*b* positioned in canister 226. While one canister temperature sensor is depicted for each of canister 222 and canister 226, it may be understood that each canister may include a plurality of temperature sensors without departing from the scope of this disclosure.

While two fuel vapor canisters are depicted at FIG. 2 (first fuel vapor canister 222 and second fuel vapor canister 226), it may be appreciated that any number of fuel vapor canisters may be arranged in series, in similar fashion, as will be elaborated in greater detail herein. Furthermore, as depicted at FIG. 2, bypass conduit 265*a* is shown for bypassing canister 222, but there is not a bypass conduit for bypassing canister 226. However, in other examples, another bypass conduit including another bypass valve may be included for bypassing canister 226, without departing from the scope of this disclosure. In other words, in some examples, there may be a bypass conduit included for bypassing the canister positioned closest to atmosphere along vent line 227.

First fuel vapor canister 222 and second fuel vapor canister 226 may include a first buffer 222*a*, and a second buffer 226*a* (or buffer region), each of the canister and the buffer comprising the adsorbent. As shown, the volume of buffer (e.g., 222*a*, 226*a*) may be smaller than (e.g., a fraction of) the volume of the fuel vapor canister (e.g., 222, 226). The adsorbent in the buffer (e.g., 222*a*, 226*a*) may be same as, or different from, the adsorbent in the canister (e.g., both may include charcoal). The buffer(s) may be positioned within the one or more canisters such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Vent line 227 may also allow fresh air to be drawn into first fuel vapor canister 222 and second fuel vapor canister 226 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the one or more fuel vapor canister(s) for purging. In some examples, vent line 227 may include an air filter 259 disposed therein upstream of second fuel vapor canister 226.

In some examples, the flow of air and vapors between first fuel vapor canister 222, second fuel vapor canister 226, and the atmosphere may be regulated by a canister vent valve 297 coupled within vent line 227 (e.g., within a second segment of vent line 227). When included, the canister vent valve may be a normally open valve, so that a fuel tank isolation valve 252 (FTIV), when included, may control venting of fuel tank 220 with the atmosphere. FTIV 252, when included, may be positioned between the fuel tank and the fuel vapor canister within fuel vapor conduit 278. FTIV 252 may be a normally closed valve, that when opened, allows for the venting of fuel vapors from fuel tank 220 to first fuel vapor canister 222, or, as described further herein, routing of fuel vapors around first fuel vapor canister 222 to second fuel vapor canister 226. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252, when included, while closing canister purge valve (CPV) 261 to direct refueling vapors into the one or more fuel vapor canisters (e.g., first fuel vapor canister 222, second fuel vapor canister 226) while preventing fuel vapors from being directed into the intake manifold.

As another example, the fuel system may be operated in a refueling mode (e.g., when fuel tank refueling is requested by a vehicle operator), wherein the controller 212 may open isolation valve 252, when included, while maintaining canister purge valve 261 closed, to depressurize the fuel tank before allowing enabling fuel to be added therein. As such, isolation valve 252, when included, may be kept open during the refueling operation to allow refueling vapors to be stored in the one or more fuel vapor canisters (e.g., first fuel vapor canister 222, second fuel vapor canister 226). After refueling is completed, the fuel tank isolation valve 252, when included, may be closed.

As yet another example, the fuel system may be operated in a canister purging mode (e.g., after an emission control device light-off temperature has been attained and with the engine running), wherein the controller 212 may open canister purge valve 261 while closing isolation valve 252 (when included). Herein, the vacuum generated by the intake manifold of the operating engine may be used to draw fresh air through vent 227 and through first fuel vapor canister 222 and second fuel vapor canister 226 to purge the stored fuel vapors into intake manifold 244. In other words, air flow may be directed through the second fuel vapor canister and the first fuel vapor canister, out of the purge port of the first fuel vapor canister to the engine intake manifold to purge fuel vapors stored in the first fuel vapor canister and the second fuel vapor canister to the engine intake manifold. In this mode, the purged fuel vapors from the one or more fuel vapor canisters are combusted in the engine. The purging may be continued until the stored fuel vapor amount in the one or more fuel vapor canisters is below a threshold. As will be discussed in further detail below, under certain circumstances it may be desirable to bypass one or more canisters during purging operations.

Controller 212 may comprise a portion of a control system 214. It may be understood that control system 214 may comprise the same control system as control system 190 depicted at FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer 291), first canister temperature sensor 232a and second canister temperature sensor 232b. Other sensors such as pressure, temperature, air/fuel ratio, and composition sensors may be coupled to various locations in the vehicle system 206. As another example, the actuators may include throttle 262, fuel tank isolation valve 252 (when included), canister purge valve 261, and canister vent valve 297, bypass valve 263a, etc. The controller 212 may receive input data from the various sensors, process the input data, and trigger the actuators in response to the processed input data based on instruction or code programmed therein corresponding to one or more routines. Example methods are described herein with regard to FIG. 4, FIG. 6 and FIG. 8.

In some examples, the controller 212 may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode. In other examples, a timer may be set which, upon the timer expiring, the controller may be returned to the awake mode.

Undesired evaporative emissions detection routines may be intermittently performed by controller 212 on fuel system 218 and evaporative emissions control system 251 to confirm that the fuel system and/or evaporative emissions control system is not compromised. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, undesired evaporative emissions detection routines may be performed while the engine is running by operating a vacuum pump (not shown) and/or using engine intake manifold vacuum.

In some configurations, a canister vent valve (CVV) 297 may be coupled within vent line 227. CVV 297 may function to adjust a flow of air and vapors between the one or more fuel vapor canisters and the atmosphere. The CVV may also be used for diagnostic routines. When included, the CVV may be opened during fuel vapor storing operations (for example, during fuel tank refueling and while the engine is not running) so that air, stripped of fuel vapor after having passed through the one or more fuel vapor canisters, can be pushed out to the atmosphere. Likewise, during purging operations (for example, during canister regeneration and while the engine is running), the CVV may be opened to allow a flow of fresh air to strip the fuel vapors stored in the one or more fuel vapor canisters. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In one example, the CVV may be closed while the vehicle is off, thus maintaining battery power while maintaining the fuel emissions control system sealed from atmosphere, however in other examples the CVV may be opened during vehicle-off conditions.

As discussed above, while FIG. 2 depicts an evaporative emissions system with two canisters, an evaporative emissions system may include any number of canisters. Accordingly, FIG. 3A depicts one example illustration of an evaporative emissions control system 305 depicting three fuel vapor canisters in series. The components of evaporative emissions control system 305 are the same as those depicted in FIG. 2, with the additional components herein described. For example, evaporative emissions control system 305 further comprises a third fuel vapor canister 229, including a third canister buffer 229a. Housed within third fuel vapor canister 229 is third canister temperature sensor 232c. Third fuel vapor canister further comprises a load/purge port 288c, and a vent port 289c. Additionally, a second bypass conduit 265b is shown, wherein one end (e.g., first end) of the second bypass conduit 265b is coupled to vent line 227 at a point between first fuel vapor canister 222 and second fuel vapor canister 226, and wherein the other end (e.g., second end) is coupled to vent line 227 at a point between second fuel vapor canister 226 and third fuel vapor canister 229. Second bypass valve 263b may be housed within second bypass conduit 265b, and may be configured to open and close based on commands from the controller. FIG. 3A thus depicts an example where the canister closest to atmosphere (e.g. third canister) does not have a bypass conduit associated, and thus cannot be bypassed.

FIG. 3A illustrates a refueling event where both the first canister and the second canister are bypassed. In other words, FIG. 3A represents a situation where both the first bypass valve 263a and the second bypass valve 263b are commanded open. It may be understood that the first and second bypass valves may be commanded open in response to an indication that the first canister and the second canister are fully loaded with fuel vapors, in one example. In another example, the first canister may be saturated with fuel vapors and there may be a determined restriction in the second canister which may contribute to premature shutoff events if the second canister were not bypassed. Thus, as depicted, fuel tank vapors are routed around the first fuel vapor canister 222, and the second fuel vapor canister 226, to the load side (load port) of the third fuel vapor canister 229, as indicated by arrows 306. Accordingly, the third fuel vapor canister loading state may be monitored via the third canister temperature sensor 232c for the remaining duration of the refueling event. Subsequent to completion of the refueling event, the third fuel vapor canister loading state may additionally be indicated. As such, under circumstances wherein the refueling event is completed and wherein the refueling event included routing of fuel tank vapors around the first fuel vapor canister 222 and the second fuel vapor canister 226 to the third fuel vapor canister 229, the loading state of all three fuel vapor canisters may be indicated, and one or more parameters of a future purging operation may be adjusted to account for the indicated loading state and/or presence or absence or restrictions for each of the three fuel vapor canisters.

As discussed above, FIG. 3A depicts an example where the third canister cannot be bypassed. However, in other example evaporative emissions control systems there may be a bypass conduit for bypassing the canister closest to atmosphere (e.g. third canister), without departing from the scope of this disclosure. Turning to FIG. 3B, depicted is an example evaporative emissions system 350, illustrating a situation where the third canister 229 includes a third bypass conduit 265c, and a third bypass valve 263c. In this configuration, under circumstances where the canister closest to atmosphere (e.g. third canister) is restricted, the canister may be bypassed to enable a refueling event, as will be elaborated in further detail below. In other words, for evaporative emissions system 350, all canisters included in the evaporative emissions system may be bypassed. It may be understood that including the ability to bypass the canister closest to atmosphere creates a situation where, if all bypass valves were commanded open along with the CVV, a path from the fuel tank to atmosphere may exist. However, control logic may prevent such an occurrence. Furthermore, it may be unlikely that all bypass valves and the CVV would be stuck open at any one time.

Thus, discussed herein a system for a vehicle may comprise an evaporative emissions system fluidically coupled to a fuel system that includes a fuel tank, the evaporative emissions system including two or more fuel vapor storage canisters. Such a system may further include a fuel tank pressure transducer and a fuel level indicator coupled to the fuel tank. Such a system may further include a controller with computer readable instructions stored on non-transitory memory that when executed during a refueling event of the fuel system. The instructions may cause the controller to monitor a rise time of a pressure via the fuel tank pressure transducer between a first time point when a fuel level in the fuel tank begins rising and a second time point when the fuel level in the fuel tank prematurely stops rising prior to the fuel level reaching a capacity of the fuel tank, the fuel level monitored via the fuel level indicator. The instructions may further cause the controller to compare the rise time to a set of baseline rise times. The instructions may further cause the controller to indicate a location of a restriction in the evaporative emissions system based on comparing the rise time to the set of baseline rise times. The instructions may further cause the controller to, responsive to the location of the restriction comprising a fuel vapor storage canister, route a fluid flow around the fuel vapor storage canister.

In such a system, the controller may be communicably coupled to a wireless network. The controller may store further instructions to send a wireless request pertaining to a fuel dispense rate of a refueling dispenser that is adding fuel to the fuel tank during the refueling event, to a refueling system that includes the refueling dispenser. The controller may store further instructions to receive the fuel dispense rate from the refueling system, and normalize the rise time of the pressure as a function of the fuel dispense rate. In such a system, the controller may store further instructions to, in response to an indication that the refueling system cannot provide the fuel dispense rate, monitor a fuel level rise rate via the fuel level sensor over a predetermined period of time to infer the fuel dispense rate, and normalize the rise time of the pressure based on the fuel dispense rate inferred from the fuel level rise rate.

In such a system, the system may further comprise one or more canister bypass valves. The controller may store further instructions to command open a canister bypass valve to route the fluid flow around the location of the restriction. In such a system, the controller may store further instructions to conduct a purging operation of the two or more canisters of fuel vapors subsequent to the refueling event, and the instructions may include instructions to command open the canister bypass valve to conduct the purging operation.

Turning now to FIG. 4, an example method 400 for determining a presence and location of a restriction in an evaporative emissions system that includes a plurality of fuel vapor storage canisters, is shown. Specifically, method 400 determines a fuel system and evaporative emissions system pressure rise time to a premature shutoff event in order to infer the approximate location of the restriction. Determining the location may reduce time spent by a technician for diagnosing fuel system and/or evaporative emissions system degradation. Furthermore, determining the location of a restriction may enable mitigating action to be taken.

Method 400 will be described with reference to the systems described herein and shown in FIGS. 1-3B, though it will be appreciated that similar methods may be applied to other systems without departing from the scope of this disclosure. Instructions for carrying out method 400 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-3B. The controller may employ actuators such as FTIV (e.g. 252), CVV (e.g. 297), first bypass valve (e.g. 263a), second bypass valve (e.g. 263b), third bypass valve (e.g. 263c), etc., to alter states of devices in the physical world according to the methods depicted below.

Method 400 begins at 405 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing to 410, method 400 includes indicating whether refueling is requested. A request for refueling may be received at the controller in response to a vehicle operator depressing a refueling button, detection of removal of a gas cap, opening of a refueling door, etc. If a request for refueling is not indicated at 410, method 400 may proceed to 415. At 415, method 400 may include maintaining current vehicle operating conditions. For example, if the engine is operating to propel the vehicle, such operation may be maintained. If the vehicle is off, the vehicle may be maintained off. Current position of various valves (e.g. FTIV, CPV, CVV, canister bypass valve(s), etc.), may be maintained. Method 400 may then end.

Returning to 410, in response to an indication of a request for refueling being received at the controller, method 400 may proceed to 420. At 420, method 400 may include depressurizing the fuel system. Depressurizing the fuel system may include commanding open the FTIV (e.g. 252), and commanding open or maintaining open the CVV (e.g. 297). In an absence of any restrictions in the evaporative emissions system, the fuel tank may rapidly (e.g. within 10 seconds, within 20 seconds, etc.) become depressurized, or in other words, pressure in the fuel system may rapidly become within a threshold of atmospheric pressure. In some examples, even if there is a source of a restriction in the evaporative emissions system, the fuel tank may depressurize, provided the restriction does not completely inhibit fluid flow. It may be understood that in such an example, pressure buildup during the process of refueling may still trigger a premature shutoff event or events of a refueling dispenser used to add fuel to the fuel tank, depending on a degree to which the pathway from the fuel tank to atmosphere is restricted.

In some examples, while not explicitly illustrated, in response to the fuel system not depressurizing to within the threshold of atmospheric pressure in a predetermined time duration (e.g. 2 minutes, 4 minutes, 5 minutes, 10 minutes, etc.), the CPV may be commanded open to relieve fuel system pressure to the intake manifold. In this way, the fuel system may be depressurized, even under circumstances where there is likely a restriction that is impeding fluid flow from the fuel system to atmosphere. As discussed above, canister restrictions may result from accumulation of dust and/or other debris, can develop due to liquid fouling of activated carbon in the canister, etc. Other evaporative emissions systems restrictions can include a stuck closed valve(s). It may be understood that in such an example, the throttle (e.g. 262) may be commanded fully closed or at least partially closed, so that fuel vapors may be prevented from escaping to atmosphere, but rather be adsorbed by the AIS HC trap (e.g. 224) positioned in the intake manifold. For the depressurization, fuel system pressure may be monitored via the fuel tank pressure transducer (e.g. 291). In such an example, where the CPV is commanded open for depressurizing the fuel tank, responsive to the fuel system being indicated to be depressurized, the CPV may be commanded closed.

With the fuel system depressurized, method 400 may proceed to 425. At 425, method 400 may include enabling access to the fuel system to allow fuel to be delivered via a dispensing nozzle to the fuel tank. For example, a refueling lock (e.g. 245) may be commanded open if the refueling lock is under control of the controller. In an example where the refueling lock is passively mechanically actuated, the refueling lock may unlock in response to fuel tank depressurization.

Continuing to 430, method 400 may include monitoring fuel system pressure (and evaporative emissions system pressure) and fuel level during the refueling event. Monitoring pressure and fuel level may enable a determination as to whether a premature shutoff of the refueling dispenser has occurred due to a restriction being present in the fuel system and/or evaporative emissions system. For example, the refueling dispenser may include an actuator that is passively mechanically actuated in response to pressure greater than a threshold pressure (e.g. 12 InH2O). Thus, responsive to a pressure build in the fuel system greater than the threshold pressure while the refueling dispenser is delivering fuel to the fuel tank, the refueling dispenser may be actuated to stop dispensing fuel. It may be understood that the FLVV (e.g. 285) may close in response to fuel level reaching a capacity of the fuel tank, which may thus trigger the dispensing nozzle to stop dispensing fuel as pressure in the fuel tank builds to the threshold pressure. However, such a case may not comprise a premature shutoff event, due to the fuel tank being full. Thus, it may be understood that a premature shutoff event includes the refueling dispenser automatically shutting off in response to pressure in the fuel system reaching the threshold pressure where the fuel level is lower than the fuel tank capacity. Thus, a premature shutoff event may additionally be inferred based on fuel level in the fuel tank plateauing, prior to the fuel level reaching a capacity of the tank and where it is determined that pressure in the fuel system reached the threshold pressure.

Accordingly, proceeding to 435, method 400 may include indicating whether a premature shutoff of the refueling dispenser is inferred. If not, method 400 may proceed to 440. At 440, method 400 includes controlling the one or more bypass valve(s) (e.g. 263A, 263*b*, 263*c*), as a function of a loading state of the one or more canisters (e.g. 222, 226, 229). Specifically, as discussed above, the one or more canister(s) may include one or more canister temperature sensor(s) (e.g. 232*a*, 232*b*, 232*c*). The canister temperature sensor(s) may monitor a change in canister temperature during refueling, and may thus enable a determination as to when a particular canister is saturated with fuel vapors.

Thus, in an example where the evaporative emissions system includes three canisters (see FIG. 3A and FIG. 3B), the canister bypass valves may be commanded closed initially during refueling, and then may be commanded open as a function of canister loading state. Specifically, in response to the first canister being indicated to be loaded with fuel vapors, the first bypass valve (e.g. 263*a*) may be commanded open to route fuel vapors generated during the refueling event around the first canister (e.g. 222), to the second canister (e.g. 226). In this way, a saturated canister may be bypassed, which may reduce an impedance to fluid flow in the evaporative emissions system. In response to the second canister (e.g. 226) becoming saturated as monitored via its canister temperature sensor (e.g. 232*b*), the second canister may be bypassed via the second bypass valve (e.g. 263*b*) being commanded open. In a situation where the third canister becomes saturated, it may be understood that the third canister, or in other words the canister closest to atmosphere along the vent line) may not be bypassed, even where there exists a third bypass conduit (e.g. 265*c* at FIG. 3B). By maintaining the third bypass valve (e.g. 263*c*) closed even when the third canister is saturated, a direct pathway for fuel tank vapors from the fuel system to atmosphere may be avoided.

Accordingly, during the process of refueling where canister loading state is monitored and bypass valve(s) controlled as a function of individual canister loading state, method 400 may proceed to 445. At 445, method 400 may include indicating whether refueling is complete. As an example, refueling may be indicated to be completed in response to an indication of a fuel level plateau for greater than a predetermined duration (e.g. 1 minute, 2 minutes) without fuel being further added to the tank. As another example, refueling may be indicated to be completed in response to the refueling lock being locked, a refueling door being closed, an indication of removal of the refueling dispenser from the fuel filler neck, etc.

If, at 445, it is indicated that refueling is not complete, method 400 may return to 430, where fuel system pressure and fuel fill level is continued to be monitored. Alternatively, responsive to refueling being indicated to be complete at 445, method 400 may proceed to 450. At 450, method 400 may include updating vehicle operating parameters. Updating vehicle operating parameters at 450 may include updating fuel fill level to reflect the refueling event. Updating vehicle operating parameters at 450 may further include commanding closed any bypass valves that were opened during the refueling event, and may include commanding closed the FTIV. It may be understood that in some examples, commanding closed the bypass valve(s) and FTIV may be carried out in response to pressure being within the threshold of atmospheric pressure following the refueling event. Method 400 may then end.

Returning to 435, in response to a premature shutoff (PSO) event being indicated, method 400 may proceed to 455. At 455, method 400 may include determining the rise time spanning a duration between the commencement of refueling as defined by a first point in time where the fuel fill level begins increasing and/or a point in time where pressure in the fuel system begins rising due to the refueling dispenser delivering fuel to the fuel tank, and a second point in time where pressure in the fuel system reaches the pressure threshold (e.g. 12 InH2O), thereby triggering the automatic shutoff of the refueling dispenser. As will be elaborated below, based on the rise time it may be possible to infer a location of a restriction present in the evaporative emissions system which may impede the flow of fuel vapors therein.

Accordingly, with the rise time to the PSO event having been determined, method 400 may proceed to 460. At 460, method 400 may include normalizing the rise time to the PSO event to an inferred fuel dispense rate. In other words, it may be understood that the rise time to a PSO event may be at least in part dependent on dispense rate of fuel to the fuel tank, the rise time increasing for slower dispense rates. For example, it may take a longer amount of time for pressure to build to a point where the refueling dispenser shuts off for a particular restriction location when the fuel dispenser is dispensing fuel at a 4 GPM (gallon/minute) rate, as compared to circumstances where the dispenser is dispensing fuel at a 12 GPM rate. If the rise time were not compensated or normalized as a function of the dispense rate, then there may be error in estimating a location of a restriction as a function of pressure rise time during refueling, elaborated in further detail below.

Accordingly, in one example, inferring the fuel dispense rate may include monitoring a rate of change of fuel fill level over time, and based on the rate of change, the fuel fill rate (e.g. gallons/minute) may be inferred. In another example the controller may rely on V2X communications for inferring fuel dispense rate. As one example, the controller of the vehicle may communicate with the refueling dispenser via V2I communications to request a dispense rate from the refueling dispenser system itself, in a case where the refueling dispenser system is capable of receiving such a request and sending such a response (such as in the case of smart fueling systems). In another example, the controller may rely on V2V communications between one or more other vehicles that have recently (e.g. within a predetermined time duration) refueled at the same station, in order to retrieve data from the one or more other vehicles pertaining to inferred fuel dispense rate. For example, the one or more other vehicles may similarly rely on rate of fuel level change to infer fuel dispense rate. By retrieving information pertaining to inferred fuel dispense rate from a plurality of vehicles, accuracy and confidence with regard to the current fuel dispense rate of the particular dispenser may be increased. In some examples where V2V communications are relied upon, selection criteria for the one or more other vehicles may include similar make/model and/or similar fuel tank size and geometry.

Accordingly, at 460, normalizing the pressure rise time to the inferred fuel dispense rate may include querying a lookup table stored at the controller that provides as output a normalized pressure rise time at the inferred fuel dispense rate. In other words, the rise time may be adjusted or normalized to reflect the inferred fuel dispense rate.

Proceeding to 465, method 400 may include comparing the normalized rise time to predetermined rise times, in order to pinpoint a location of the restriction that contributed to the PSO event. Again, another lookup table may be stored at the controller that enables the controller to determine a location of the restriction as a function of the normalized rise time for the given fuel system configuration of canisters. As a non-limiting example, a normalized rise time of 5 seconds may be indicative of a stuck closed CVV, while a normalized rise time of 1.5 seconds may be indicative of a stuck closed FTIV. In other non-limiting examples, a normalized rise time of 2 seconds may be indicative of a restriction in the first canister, a normalized rise time of 3 seconds may be indicative of a restriction in the second canister, and a normalized rise time of 4 seconds may be indicative of a restriction in the third canister, under circumstances where the evaporative emissions system includes three canisters.

The data stored at such a lookup table as that discussed with regard to step 465 may be based on learned or taught rise times for a particular restriction location or locations. In one example, prior to the vehicle being sold to a customer, testing may include introducing restrictions into various locations of the fuel system and/or evaporative emissions system, and determining an average rise time to a PSO event for the given restriction. For example, a technician may introduce a restriction to fluid flow in the second canister, and monitor a rise time to a PSO event while adding fuel to the fuel tank at a predetermined fuel fill rate. The rise time may then be incorporated into the lookup table described for step 465, so that after the vehicle has been sold, the lookup table may be relied upon for the diagnostic methodology of FIG. 4. It may be understood that the same methodology may be carried out for the same restriction any number of times, to increase confidence in the values stored at the lookup table. It may be further understood that the same methodology may be carried out for any number of different dispense rates, and for any number of different restriction points. In this way, an accurate lookup table may be stored at the controller, enabling the controller to, given a particular normalized pressure rise time, retrieve a location of the restriction.

Accordingly, with the restriction location determined at 465, method 400 may proceed to 470. At 470, method 400 may include storing the result at the controller. Continuing to 475, method 400 may determine whether the restriction can be avoided via the commanding open one of the canister bypass valves. For example, in a situation where the restriction is determined to comprise the CVV being stuck closed or at least closed enough to result in a premature shutoff event, there may not be a way to bypass the CVV. Accordingly, method 400 may proceed to 485, where refueling may be discontinued. For example, an alert may be provided to the vehicle operator in the form of a text-based message at a message center at the vehicle dash, alerting the vehicle operator of the restriction that is impeding the adding of fuel to the fuel tank. Additionally or alternatively, such a message or alert may be communicated to the vehicle operator via a text-based message sent to the vehicle operator's phone, an audible message in the form of a recognizable pattern of horn honking, etc. In response to such an alert, it may be understood that the vehicle operator may be able to continue to add more fuel to the fuel tank in the form of trickle-filling, but it may be understood that the refueling event may include a number of PSO events. While frustrating to the vehicle operator or gas station attendant dispensing the fuel, trickle-filling may enable enough fuel to be added to the fuel tank to enable the vehicle to travel to a desired location where the vehicle may be serviced, for example. By being provided an indication that there is a restriction that cannot be bypassed, the vehicle operator may be satisfied with a diagnosis, rather than simply not knowing why the PSO event is occurring. In a circumstance where a text-based message is relied upon for communicating the issue of the restriction to the operator, instructions may be included that inform the operator of the ability to trickle-fill the tank with the knowledge that a number of PSO events are likely to occur during the trickle-filling. Regardless of whether trickle-filling is utilized to add more fuel to the tank, at some point it may be understood that refueling may be discontinued. Similar to that discussed above, discontinuing of refueling may be inferred based on fuel level plateauing for greater than the predetermined duration (e.g. 1 minute, 2 minutes, etc.), an indication that the refueling lock has been locked, that the refueling door has been closed, an indication that the refueling dispenser has been removed, etc.

In response to the refueling event being discontinued, method 400 may proceed to 490. At 490, method 400 may include updating vehicle operating parameters. Updating vehicle operating parameters may include updating a level of fuel stored in the fuel tank to reflect the refueling event. Updating vehicle operating parameters may further include setting a diagnostic trouble code (DTC) related to the location of the restriction that cannot be bypassed, and may still further include illuminating a malfunction indicator light (MIL) at the vehicle dash, alerting the vehicle operator of a request to have the vehicle serviced. Method 400 may then end.

While not explicitly illustrated, in some examples where a restriction is indicated via the methodology of FIG. 4 that cannot be bypassed by commanding open a canister bypass valve, it may be understood that an alternative methodology may be relied upon for allowing refueling to continue. Specifically, control methodology may determine whether a temperature of the exhaust catalyst (e.g. 270) is greater than a threshold temperature (e.g. light-off temperature). If may be further determined based on current ambient temperature, how long it is expected that the exhaust catalyst will remain above the threshold temperature. The control system may then assess whether it is likely that the refueling event will be able to be completed within the inferred time frame that the exhaust catalyst is expected to remain above the threshold temperature. Such an assessment may be based on at least current level of fuel in the fuel tank and fuel dispense rate. If it is determined that the exhaust catalyst is expected to remain above the threshold temperature for the duration of the refueling event, then the following methodology may be undertaken. Specifically, the CPV may be commanded open, and the throttle may be commanded closed or at least partially closed. In this way, fuel vapors may be directed to the intake manifold, where they may be adsorbed by the AIS HC trap positioned therein. Then in response to refueling being completed, the controller may command open the throttle, close the CPV, and rotate the engine unfueled to draw fuel vapors in the intake manifold to the exhaust catalyst for processing. In this way, refueling may be enabled to continue, under conditions where an inferred restriction location in the evaporative emissions system is unable to be bypassed. Such an example pertains to situations where the CVV is determined to comprise the source of the restriction, or where the air filter (e.g. 259) is determined to comprise the source of the restriction. Such an example may further pertain to situations where the restriction is inferred to be in a canister closest to atmosphere along the vent line, but where there is not a possibility of bypassing the canister (e.g. no bypass conduit around the canister).

Returning to 475, in a case where it is determined there is a restriction that is the reason for the PSO event, and where it is further determined that the restriction may be bypassed, method 400 may proceed to 480. At 480, method 400 may include controlling the appropriate bypass valve to avoid the restriction. For example, turning to FIG. 3A, in an example where the second canister is determined to comprise the source of the restriction, at 480 method 400 may include commanding open the second bypass valve (e.g. 263*b*). It may be understood that determining the location of the restriction may occur prior to the first canister being fully loaded with fuel vapors, and thus, in such a case, the first bypass valve (e.g. 263*a*) may be maintained closed so fuel vapor may first load the first canister. Accordingly, with the appropriate bypass valve being commanded open at 480, method 400 may proceed to 435. At 435, method 400 may again include indicating whether a PSO event occurs. A PSO event of substantially (e.g. within 5% of, or within 2% of) the same duration may as the initial PSO event may be indicative of the bypass valve that was commanded open, being stuck closed. A PSO of a different duration may be indicative of another restriction. In other words, if, at 435, another PSO event is indicated, method 400 may again proceed to 455, where the same methodology as that just discussed may be carried out. However, a different lookup table may be relied upon at 465, the lookup table comprising a lookup table with values for restriction location as a function of normalized rise time that accounts for the fact that a bypass valve has been commanded open. In other words, there may be several lookup tables stored at the controller which enable determination of a restriction location as a function of whether or not one or more bypass valves are commanded open.

Alternatively, if at 435 a PSO event does not occur in response to the commanding open of the appropriate bypass valve for bypassing the inferred restriction, method 400 may proceed to 440, where, as discussed above, canister bypass valve(s) may be controlled as a function of canister loading state. Returning to FIG. 3A, in a situation where the restriction was indicated for the second canister (e.g. 226) and the second bypass valve was commanded open to bypass the second canister, loading state of the first canister (e.g. 222) may be monitored, and the first canister may be bypassed in response to the first canister becoming saturated with fuel vapors. In response to refueling being indicated to be complete at 445, method 400 may proceed to 450. At 450, method 400 may include updating vehicle operating parameters. Updating vehicle operating parameters may include setting a DTC at the controller indicating the location of the inferred restriction. A MIL may be illuminated at the vehicle dash, to alert the vehicle operator of a request to have the vehicle serviced. A level of fuel stored at the controller may be updated to reflect the refueling event. Still further, canister loading state for each of the canisters may be updated to reflect the refueling event. For example, as will be elaborated below in further detail, canister purging operations that rely on the engine or on natural temperature fluctuations may be adjusted as a function of the loading state of each canister in an evaporative emissions system that includes multiple canisters.

While the example methodology depicted with regard to FIG. 4 relates to evaporative emission systems that include bypass conduits for bypassing particular canisters, it may be understood that similar methodology may be used for vehicles that do not include bypass conduits, which may allow for a location of a particular restriction to be pinpointed which may expedite servicing of the vehicle, but where it may not be possible to bypass a canister that is indicated as comprising the restriction.

Furthermore, while not explicitly illustrated at FIG. 4, it may be understood that an entry condition for conducting the methodology to infer restriction location may include a fuel level lower than a predetermined threshold fuel level (e.g. less than 15% full). In this way, the methodology may be robust as rise time may vary for different fuel levels. By enabling the diagnostic to execute when fuel level is less than the predetermined threshold fuel level, variation in rise time as a function of initial fuel level may be avoided, thus increasing robustness of the diagnostic methodology. However, in other examples, it may be understood that conditions being met may not include fuel level below the predetermined threshold fuel level, and the different rise times at different fuel levels for different dispense rates may be determined similar to that discussed above. In this way, in some examples the diagnostic depicted at FIG. 4 may be conducted regardless of initial fuel level in the fuel tank.

Turning now to FIG. 5, an example timeline 500 for determining a location of a restriction in a vehicle fuel system and/or evaporative emissions system, is depicted. It may be understood that for this example timeline, the evaporative emissions system of the vehicle includes three fuel vapor storage canisters, where the first two canisters may be individually bypassed but where there is not a bypass conduit around the third canister (the third canister being closest to atmosphere along the vent line). In other words, example timeline 400 may be understood to correspond to a system such as that depicted at FIG. 3A. Timeline 500 includes plot 505, indicating whether refueling is requested (yes or no), over time. Timeline 500 further includes plot 510, indicating whether the FTIV (e.g. 252) is open or closed, over time. Timeline 500 further includes plot 515, indicating whether the first bypass valve (e.g. 263*a*) is open or closed, over time. Timeline 500 further includes plot 520, indicating whether the second bypass valve (e.g. 263*b*) is open or closed, over time. Timeline 500 further includes plot 525, indicating a loading state of the first canister (e.g. 222), plot 530, indicating a loading state of the second canister (e.g. 226), and plot 535, indicating a loading state of the third canister (e.g. 229), over time. For each of plots 525, 530 and 535, canister loading state may either be clean (e.g. substantially clean, or loaded to 5% or less with vapors), or may be loaded to varying extents (+) increasing along the vertical axis. Timeline 500 further includes plot 540, indicating pressure in the fuel system and evaporative emissions system as monitored via the FTPT (e.g. 291), over time. In this example timeline, pressure is either at atmospheric pressure (atm), or is positive (+) with respect to atmospheric pressure. Timeline 500 further includes plot 545, indicating fuel level in the fuel tank, as monitored via the fuel level indicator (FLI) (e.g. 234), over time. For plot 545, the fuel tank may be empty, or may have varying levels of fuel increasing (+) along the vertical axis. Timeline 500 further includes plot 550, indicating whether a restriction is inferred, over time. In this example timeline, for simplicity, depicted is a potential restriction or blockage in the first canister or second canister.

At time t0, refueling is requested (plot 505), the FTIV is open (plot 510), and each of the first bypass valve, second bypass valve and third bypass valve are all closed (refer to plots 515, 520, and 525, respectively). Fuel level in the tank is near empty, as indicated by fuel level being below the predetermined threshold fuel level (e.g. less than 15% full), represented by line 546.

Pressure as monitored via the FTPT (e.g. 291) is near atmospheric pressure. Thus, it may be understood that by time t0, the FTIV has been commanded open and pressure in the fuel system has become within the threshold of atmospheric pressure (e.g. within 5% of atmospheric pressure). While not explicitly illustrated, it may be understood that the CVV is also open at time t0.

At time t1, fuel level in the fuel tank begins increasing (plot 545), as monitored via the FLI. Pressure as monitored via the FTPT begins increasing as a result of fuel being dispensed into the fuel tank. Furthermore, with the FTIV open but the first, second and third bypass valves all being closed, fuel vapors are routed to the first canister. As such, between time t1 and t2, fuel level rises, pressure in the fuel system and evaporative emissions system rises, and the loading state of the first canister increases slightly.

At time t2, pressure in the fuel system and evaporative emissions system begins rapidly increasing, and at time t3, the pressure threshold (e.g. 12 InH2O) is reached, represented by line 541. Accordingly, while not explicitly illustrated, it may be understood that an automatic shutoff of the refueling dispenser occurs. Between time t3 and t4, fuel level in the fuel tank no longer increases, due to the fuel dispenser being shut off. Along similar lines, loading state of the first canister stops increasing, due to the fuel dispenser being shut off. Furthermore, pressure in the evaporative emissions system rapidly declines as a result of the fuel dispenser being shut off.

Between time t3 and t4, the controller determines the rise time to the PSO event comprising the time between the initiation of fuel being delivered to the fuel tank at time t1, and when the pressure buildup results in the automatic shutoff of the refueling dispenser at time t3. Thus, the rise time comprises the duration between time t1 and t3, as indicated via line 542. Furthermore, between time t3 and t4, the controller infers the dispense rate at which the dispensing nozzle delivers fuel to the fuel tank. In this example timeline, while not explicitly illustrated, it may be understood that the controller infers the dispense rate based on a rate at which fuel level in the fuel tank is increasing. Based on the inferred fuel dispense rate, it may be understood that the controller obtains a normalized rise time based on a lookup table that outputs a normalized rise time as a function of fuel dispense rate. Then the controller determines, based on another lookup table as discussed above at FIG. 4, the location of the restriction that resulted in the PSO event. In this example timeline 500, the controller determines that the location of the restriction comprises the first canister (plot 550).

Accordingly, because the restriction is impeding fuel vapor flow through the first canister, at time t4 the first bypass valve is commanded open, such that fuel vapors may bypass the first canister. The second bypass valve is maintained closed.

With the first canister bypassed due to the indicated restriction therein, at time t5 refueling again commences. Between time t5 and t6, pressure in the fuel system and evaporative emissions system rises and then plateaus. Fuel level linearly increases in the fuel tank, and the second canister is progressively loaded with fuel vapors generated from the refueling event. Because the first canister is bypassed, the first canister does not become further loaded with fuel vapors to any appreciable extent. Thus, it may be understood that because pressure as monitored via the FTPT rises and plateaus between time t5 and t6, that no other PSO events are indicated during that time frame.

At time t6, the second canister is indicated to be saturated with fuel vapors, or in other words, canister load reaches a maximum threshold canister load represented by line 531. It may be understood that the second canister temperature sensor positioned in the second canister is relied upon for inferring the second canister loading state. With the second canister having been indicated to be saturated, the second bypass valve is commanded open via the controller.

With the commanding open of the second bypass valve, it may be understood that the saturated second canister is essentially removed from the fuel vapor path between the fuel tank and atmosphere. Accordingly, there is a brief drop in pressure between time t6 and t7. In some examples, this pressure decrease in response to a bypass valve being commanded open may serve as an indication that the bypass valve opened when commanded to do so. A lack of such a pressure decrease in response to a bypass valve being commanded open may be indicative of the bypass valve being stuck closed.

With the second canister bypassed via the commanding open of the second bypass valve, fuel level continues to rise, and accordingly, fuel vapors are routed to the third canister. Thus, the loading state of the third canister increases between time t7 and t9. However, beginning at around time t8, pressure in the fuel system and evaporative emissions system begins rapidly increasing, and at time t9, the pressure threshold is again reached. It may be understood that the pressure threshold is reached because the fuel tank is filled to capacity, which closes the FLVV, thereby resulting in a rapid pressure increase in the fuel tank which serves to induce automatic shutoff of the refueling dispenser. Accordingly, between time t9 and t10, with the refueling dispenser shut off, pressure rapidly decreases as monitored via the FTPT, and fuel level remains stable. At time t10, each of the FTIV, first bypass valve and second bypass valve are commanded closed, as refueling is no longer being requested due to the refueling event being completed.

Thus, as depicted at FIG. 5, timeline 500 illustrates how a restriction location may be inferred during a refueling event based on a rise time to a PSO event, and how in some examples a restriction may be bypassed to enable refueling to continue without further PSO events being encountered.

After time t10, it may be understood that the controller updates the loading state of each of the canisters in the evaporative emissions system. The updated canister loading states, along with the indication of restriction location, may be used to conduct canister purging operations as will be elaborated in further detail below.

Thus, discussed herein a method may comprise diagnosing an evaporative emissions system including identifying a location of degradation in an evaporative emissions system of a vehicle based on a rise time at which a pressure in a fuel system of the vehicle rises to a threshold pressure during a refueling event where fuel is added to the fuel system via a refueling dispenser.

In such a method, the threshold pressure may be a pressure at which an automatic shutoff of the refueling dispenser is triggered.

In such a method, diagnosing the evaporative emissions system may include fluidically coupling the fuel system to the evaporative emissions system, and fluidically coupling the evaporative emissions system to atmosphere.

In such a method, the degradation may comprise a restriction in the evaporative emissions system, and the location of the restriction may be related to the rise time.

In such a method, the method may further comprise inferring a dispense rate at which the fuel is added to the fuel system via the refueling dispenser, and normalizing the rise time based on the dispense rate to identify the location of degradation. In one example, the method may include monitoring a fuel level change in the fuel system during the refueling event, wherein the dispense rate is inferred based on the fuel level change as a function of time. In another example, the dispense rate may be retrieved via V2X communications, including wireless communication between a controller of the vehicle and one or more other vehicles, and/or communication between the controller of the vehicle and a refueling station at which fuel is added to the fuel system via the refueling dispenser.

In such a method, diagnosing the evaporative emissions system may include comparing the rise time to a set of predetermined baseline rise times corresponding to various degradation locations in the evaporative emissions system in order to identify the location of degradation.

In such a method, the method may further comprise actuating a valve to bypass the location of degradation in response to the evaporative emissions system diagnostic identifying the location of degradation.

In such a method, the method may further comprise controlling a purging event of one or more fuel vapor storage canisters positioned in the evaporative emissions system based on the location of degradation identified via the evaporative emissions system diagnostic.

Another example of a method may comprise conducting an evaporative emissions system diagnostic to identify a location of a restriction in an evaporative emissions system of a vehicle based on a pressure rise time between a first time at which fuel is commenced being added to a fuel system of the vehicle via a refueling dispenser and a second time corresponding to a premature shutoff of the refueling dispenser, and controlling a valve positioned in the evaporative emissions system in response to the identified location of the restriction.

In such a method, the pressure rise time may be monitored via a fuel tank pressure transducer. The pressure rise time may be adjusted based on an inferred rate at which fuel is being added to the fuel system via the refueling dispenser.

In such a method, the premature shutoff of the refueling dispenser may occur as a result of the restriction impeding a fluid flow between the fuel system and atmosphere while fuel is being added to the fuel system.

In such a method, the pressure rise time may be compared to a set of predetermined pressure rise times corresponding to a plurality of restriction locations to determine the location of the restriction.

In such a method, controlling the valve may include commanding open the valve in order to bypass the location of the restriction to enable fuel to continue being added to the fuel system without inducing another premature shutoff of the refueling dispenser.

Turning now to FIG. 6, an example method 600 for controlling an evaporative emissions system to back purge fuel vapors stored in one or more fuel vapor canister(s) to a fuel tank, is shown. More specifically, the methodology of FIG. 6 depicts control strategy for controlling a route whereby one or more canisters are back purged to the fuel tank, as a function of one or more of canister loading state and presence/absence of inferred restrictions which may adversely impact back purging operations. Said another way, the methodology of FIG. 6 enables selection of a canister or canisters to back purge to the fuel tank based on one or more of canister loading state and presence/absence of inferred restrictions. In this way, efficiency of back purging operations for multi-canister evaporative emissions systems may be improved.

Method 600 will be described with reference to the systems described herein and shown in FIGS. 1-3B, though it will be appreciated that similar methods may be applied to other systems without departing from the scope of this disclosure. Instructions for carrying out method 600 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-3B. The controller may employ actuators such as FTIV (e.g. 252), CVV (e.g. 297), first bypass valve (e.g. 263*a*), second bypass valve (e.g. 263*b*), third bypass valve (e.g. 263*c*), etc., to alter states of devices in the physical world according to the methods depicted below.

Method 600 begins at 605 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 610, method 600 may include indicating whether a vehicle-off event has occurred. A vehicle-off event may be indicated in response to a key-off event, for example, or any other event in which the vehicle is deactivated. If a vehicle-off event is not indicated at 610, method 600 may proceed to 615. At 615, method 600 may include maintaining current vehicle operating conditions. For example, if the engine is in operation for propelling the vehicle, such engine operation may be maintained. If the vehicle is being propelled at least partially via electrical energy, such operation may be maintained. Furthermore, a current operational status of one or more valves (e.g. FTIV, CVV, first bypass valve, second bypass valve, third bypass valve, CPV, etc.) may be maintained. Method 600 may then end.

Returning to 610, in response to a vehicle-off event being indicated, method 600 may proceed to 620. At 620, method 600 may include retrieving forecast weather and temperature data. In one example, such information may be retrieved in conjunction with the onboard navigation system (e.g. 195). For example, the onboard navigation system may be configured to retrieve weather information from one or more weather centers. Additionally or alternatively, as mentioned above the controller of the vehicle may be communicatively coupled to the internet, such that the controller may request and retrieve weather forecast data from one or more internet web sites (e.g. National Weather Service). Additionally or alternatively, V2X communications may be relied upon for retrieving forecast weather information.

The forecast weather information retrieved may pertain to a 24 hour period beginning at the time of the vehicle-off event, in some examples. However the forecast weather information retrieved may pertain to different time durations (e.g. greater or lesser than 24 hours) without departing from the scope of this disclosure.

The forecast weather information retrieved may pertain to expected ambient temperature changes and weather conditions related to a diurnal cycle. For example, a diurnal cycle temperature variation may include a heat gain portion of the diurnal cycle, and a heat loss portion of the diurnal cycle. The heat gain portion may comprise a portion of the diurnal cycle where ambient temperatures are increasing, whereas the heat loss portion may comprise a portion of the diurnal cycle where ambient temperatures are decreasing. Based on the forecast weather information, the controller may determine a first time duration comprising the heat gain portion and a second time duration comprising the heat loss portion. The controller may further determine an approximate time when temperature corresponding to the heat gain portion is greatest or maximal, and may also determine an approximate time when temperature corresponding to the heat loss portion is lowest, or minimal. Said another way, the controller may determine the approximate time when it is expected based on the forecast weather data that the heat gain portion of the diurnal cycle will switch or begin transitioning to a heat loss portion, and may further determine the approximate time when it is expected that the heat loss portion of the diurnal cycle will switch or begin transitioning to a heat gain portion. Such information may be stored at the controller and utilized in the method of FIG. 6 as described in further detail below.

With the forecast weather data retrieved, method 600 may proceed to 625. At 625, method 600 includes indicating whether the current time corresponds to the heat gain portion of the diurnal cycle. If so, method 600 may proceed to 630. At 630, method 600 includes commanding closed the FTIV and the one or more canister bypass valve(s) (e.g. 263*a*, 263*b*, 263*c*). In this way, the fuel system may be sealed from atmosphere during the heat gain portion of the diurnal cycle, where it may be expected that fuel vaporization may occur. By sealing the fuel tank, loading of the canisters with fuel vapors may be prevented during the heat gain portion of the diurnal cycle.

Proceeding to 635, method 600 includes determining the time duration until the maximum diurnal cycle temperature. As discussed above, such information may be determined based on the retrieved forecast weather and temperature data. Continuing to 640, method 600 may include setting a timer to wake the controller at a time corresponding to the inferred maximum diurnal cycle temperature. In other words, the timer may be set to expire at the time corresponding to the inferred maximum diurnal cycle temperature, at which point the expiring timer may trigger the controller to return to the awake mode of operation. With the timer set at 640, the controller may be slept.

Proceeding to 645, method 600 may include indicating whether the timer has expired. If not, method 600 may proceed to 650. At 650, method 600 may include indicating whether vehicle operation has been requested via the vehicle operator. For example a request for vehicle operation may include a key-on event, a remote-start event, the vehicle-operator depressing an ignition button on the vehicle-dash, etc. If such a request is not indicated at 650, method 600 may continue to monitor whether timer expiration is indicated (e.g. the method may return to step 645). Alternatively, responsive to the request for vehicle operation being received, method 600 may proceed to 655. At 655, method 600 may include commanding or maintaining closed the FTIV and bypass valve(s) (e.g. 263*a*, 263*b*, 263*c*). Continuing to 660, method 600 may include updating vehicle operating parameters. Updating vehicle operating parameters may be a function of the vehicle being activated in response to the request for operation. For example, current temperature of an exhaust catalyst (e.g. 270) may be updated, canister loading state(s) may be updated, fuel level in the fuel tank may be updated, etc. Method 600 may then end.

Returning to 645, in response to the timer expiring, method 600 may proceed to 670. At 670, method 600 may include waking the controller. For example at 670, the controller may transition from the reduced power mode or sleep mode where only essential functions are maintained, to the awake mode that operates at a higher battery consumption and with full functionality as compared to the sleep mode.

With the controller awakened, method 600 may proceed to 675. At 675, method 600 may include commanding open the FTIV, and may further include controlling the one or more bypass valves as a function of canister loading state and presence or absence of restriction(s) inferred, for example, via the methodology of FIG. 4.

More specifically, during the heat loss portion of the diurnal cycle, as ambient temperatures cool a vacuum may develop in the fuel system. With a vacuum in the fuel system, atmospheric air may be drawn in through the vent line (e.g. 227) and through one or more canister(s), displacing fuel vapors from the one or more canisters. However, in a situation such as depicted at FIG. 3A and FIG. 3B where there are multiple canisters (e.g. 3) arranged in series along the vent line, depending on the loading states of the individual canisters, fuel vapors may be displaced from one canister (e.g. third canister 229) and be adsorbed by an adjacent canister (e.g. second canister 226) in a situation where there is at least some free activated carbon in the adjacent canister (or any canister positioned between the canister which fuel vapors are being displaced from, and the fuel tank. The desorbing of fuel vapors from one canister and then being adsorbed by another canister may prevent the fuel vapors from being displaced to the fuel tank where the vapors may condense, which may limit the effectiveness of the back purging operation. Specifically, fuel vapors displaced from one canister only to then be adsorbed by another canister may simply moves the vapors between canisters, and the vapors may then migrate towards atmosphere again in response to ambient temperatures increasing, heat rejection from engine operation, etc. A more desirable situation may be where fuel vapors are effectively directly back purged to the fuel tank.

Accordingly, at 675, method 600 may assess canister loading state, and control the FTIV, CVV and bypass valve(s) accordingly to ensure that fuel vapors from a canister being back purged are routed directly to the fuel tank, rather than being routed through one or more other canisters where the fuel vapors may adsorb therein.

For example, turning to FIG. 3A, in a situation where a loading state of the first canister (e.g. 222) is greater than a threshold load, where the second canister (e.g. 226) is greater than a threshold load, and the third canister (e.g. 229) is loaded, for example, to 50%, both the first bypass valve (e.g. 263a) and the second bypass valve (e.g. 265a) may be commanded open in response to the indication of the heat loss portion of the diurnal cycle commencing. The FTIV may also be commanded open, and the CVV may be commanded or maintained open. In this way, the third canister may be back purged directly to the fuel tank, rather than the fuel vapors being desorbed from the third canister and routed through the second canister and then the first canister en route to the fuel tank. It may be understood that the threshold load may comprise 60% full, 70% full, 75% fuel, 80% full, 90% full, etc. In some examples, the threshold load may comprise an indication of a canister that is saturated with fuel vapors. Even in a case where, for example, both the second canister and first canister are saturated, back purging the third canister through the second canister and then the first canister back to the fuel tank may not be effective, due to the restrictive nature of the saturated canisters. For example, fuel vapors may desorb from the third canister, and may not readily be routed to the fuel tank, but rather may be inhibited from reaching the fuel tank due to the restrictive nature of the saturated canisters. By commanding open the first and second bypass valves in such an example, fuel vapors may readily be displaced from the third canister to the fuel tank.

In such an example, in one embodiment canister loading state of the third canister may be periodically monitored (e.g. the controller may be awoken at predetermined time intervals to assess canister loading state), and in response to the inferred canister loading state of the third canister becoming substantially clean (e.g. loaded to 5% or less with fuel vapors), method 600 may include commanding closed the second bypass valve while maintaining open the first bypass valve. In this way, the second canister may then be directly back-purged to the fuel tank, rather than being routed through the first canister. Such action may be taken under circumstances where the third canister becomes substantially clean prior to the transitioning from the heat loss portion of the diurnal cycle to the heat gain portion. In similar fashion, in response to the second canister then becoming cleaned of fuel vapors, the second bypass valve may be commanded open and the first bypass valve may be commanded closed. In this way, the clean second canister may be bypassed, thus removing the canister from the pathway for air flow to the first canister, which may improve desorption effectiveness of fuel vapors stored in the first canister. Turning to FIG. 3B, in an example where the third canister includes an associated third bypass conduit and third bypass valve, upon the third canister being substantially clean, the third bypass valve may be commanded open in similar fashion, to remove the third canister from the pathway for airflow to the second canister or, if the second canister is additionally bypassed, the pathway for airflow to the first canister. While the above methodology includes periodically waking the controller to assess canister loading state, it may be understood that in other examples the methodology may not include periodically waking the controller to assess canister loading state. In a case where the controller is not periodically woken to assess canister loading state, it may be understood that the status of the bypass valves may be set and may remain unchanged for the heat loss portion of the diurnal cycle.

Thus, at 675, method 600 may include controlling one or more canister bypass valves in order to back purge a selected canister directly to the fuel tank. The selected canister may comprise a canister that is at least partially loaded with fuel vapors and may further comprise a canister that, if the one or more canister bypass valves were not controlled, the back purging of the canister may result in fuel vapors desorbed from the selected canister being adsorbed by or restricted in flow via one or more other canisters.

As another example, the controlling of the one or more bypass valve(s) may additionally or alternatively be a function of whether or not a restriction has been inferred in the evaporative emissions system via, for example, the methodology of FIG. 4. For example, it may not be desirable to attempt back purging of a canister that has been inferred to be restricted, as such action may render the back purging operation ineffective. Returning to FIG. 3B, in an example where the first canister is indicated to be restricted, the second canister is indicated to be loaded to at least the threshold load, and the third canister is at least partially loaded, control strategy may be as follows. Specifically, in response to an indication of the heat loss portion of the diurnal cycle, the third bypass valve (e.g. 263c) may be commanded closed, the second bypass valve (e.g. 263b) may be commanded open, and the first bypass valve (e.g. 263a) may be commanded open. The FTIV and the CVV may too be commanded open. In this way, as vacuum develops in the fuel tank, fresh air may be drawn across the third canister and around the second canister and the first canister (e.g. through the second bypass conduit and the first bypass conduit, respectively) such that fuel vapors desorbed from the third canister may be directly routed to the fuel tank, bypassing both the second, loaded canister, and the first, restricted canister. Then in response to the third canister being indicated to be substantially clean, the third bypass valve may be commanded open, the second bypass valve may be commanded closed, and the first bypass valve may be maintained open. In this way, the third canister may be removed from the fresh air flow pathway such that fresh air is drawn across the second canister where fuel vapors may be desorbed and routed around the first, restricted canister, en route to the fuel tank. In response to the second canister then becoming clean, no further action may be taken as it may not be desirable to attempt to back purge the restricted first canister.

In another related example, continuing with the reference to FIG. 3B, in a situation where the third canister is indicated to be restricted, but where both the first canister and the second canister are loaded to at least the threshold load, the following control strategy may be used for back purging during a heat loss portion of a diurnal cycle. Specifically, the third bypass valve (e.g. 263c) may be commanded open to bypass the restricted third canister. The second bypass valve (e.g. 263b) may be commanded closed and the first bypass valve (e.g. 263a) may be commanded open. In this way, fresh air flow may be routed around the restricted third canister and into the second canister. Fuel vapors desorbed from the second canister may then be routed around the first canister so as to be directly routed to the fuel tank. Then, in response to an indication that the second canister is substantially clean, the second bypass valve may be commanded open (with the first bypass valve maintained closed and the third bypass valve maintained open), so as to direct the fresh air flow at the first canister.

A few examples have herein been provided as to how control strategy may control the one or more bypass valves, FTIV and CVV for back purging operations as a function of loading state of one or more canisters and presence/absence of one or more inferred restrictions in the evaporative emissions system. Other examples of similar nature are within the scope of this disclosure, and it may be understood that such methodology may apply to evaporative emissions systems that include N canisters, where either the N canisters are capable of being bypassed or N−1 canisters are capable of being bypassed. In some examples, N canisters refers to at least two canisters.

Continuing to 680, method 600 may include determining a time duration until the minimum temperature of the diurnal cycle is expected based on the forecast weather and temperature data. In other words, at 680, method 600 may include determining an approximate time when the heat loss portion of the diurnal cycle transitions to a heat gain portion of the diurnal cycle. Continuing to 685, method 600 may include setting a timer to wake the controller at the minimum diurnal cycle temperature, and may further include sleeping the controller. While not explicitly illustrated and as mentioned above, it may be understood that for methodology discussed with regard to step 675 whereby in response to a canister becoming substantially clean during the back purging operation such that it is desirable to control the bypass valve(s) in order to then back purge another canister, the controller may have to be periodically awoken to assess canister loading state and to change the commanded status of various bypass valve(s). It may be understood that the periodic waking of the controller may be controlled by a separate timer on a different schedule. For example, the controller may be woken every hour, every 2 hours, etc., though lesser time durations and greater time durations have been contemplated and may be used without departing from the scope of this disclosure. However, in other examples once a particular pattern of control for the bypass valves has been set in order to back purge a selected canister, the particular pattern may remain until the controller is awoken by the timer set at step 685, and may not include periodically waking the controller to re-assess canister loading states. In other words, even in response to a particular selected canister becoming clean, no further action may be taken in some examples, until the controller is awoken in response to the timer set at 685 expiring. As discussed, it may be understood that the timer set at step 685 comprises a timer set to expire when the heat loss portion of the diurnal cycle transitions to the heat gain portion.

Accordingly, at step 690, method 600 thus determines whether the timer set at step 690 has expired. If not, method 600 may proceed to step 650, where it may be determined as to whether vehicle operation has been requested, as discussed above. If not, method 600 may return to step 690, where it may be again determined as to whether the timer has expired or not.

Alternatively, in response to vehicle operation being requested, method 600 may proceed to 655 where the FTIV and any open bypass valve(s) may be commanded closed. Then, at 660 vehicle operating parameters may be updated as discussed above. Method 600 may then end.

Returning to 690, in response to the timer expiring, method 600 may return to 630, where the FTIV and any bypass valves that are open, may be commanded closed. In other words, because the diurnal cycle has entered into the heat gain portion, it may be desirable to command closed the FTIV and any open bypass valves, so as to prevent further loading of the one or more canisters with fuel vapors stemming from the fuel tank during the heat gain portion of the diurnal cycle. Continuing to 635, method 600 continues as described above, where it is again determined as to when the transition from the heat gain portion of the diurnal cycle to the heat loss portion is inferred, and the timer may again be set in similar fashion as that already described above. In this way, in a situation where the vehicle remains stationary in the vehicle-off condition for any number of diurnal cycles, control strategy may effectively back purge selected canisters to the fuel tank during heat loss portions of the diurnal cycle while avoiding further loading of the one or more canisters during heat gain portions of the diurnal cycle. It may be understood that in a situation where the vehicle is maintained stationary in the vehicle-off condition for a number of diurnal cycles, forecast weather and temperature data may have to be periodically updated, for example once every 12 hours, once every 24 hours, etc.

Turning now to FIG. 7, an example timeline 700 for controlling a back purging operation according to the methodology of FIG. 6, is shown. Timeline 700 includes plot 705, indicating whether a vehicle-off event is inferred (yes or no), over time. Timeline 700 further includes plot 710, indicating whether a heat gain portion of the diurnal cycle is currently indicated (yes or no), over time. Timeline 700 further includes plot 715, indicating whether it is currently a heat loss portion of the diurnal cycle (yes or no), over time. Timeline 700 further includes plot 720, indicating a current status of the controller (sleep or awake), over time. Timeline 700 further includes plot 725, indicating a loading state of the first canister (e.g. 222), plot 730, indicating a loading state of the second canister (e.g. 226), and plot 735, indicating a loading state of the third canister (e.g. 229), over time. For each of plots 725, 730 and 735, the respective canisters may be either substantially clean (clean) or may be loaded to an extent greater than (+) clean. Timeline 700 further includes plot 740, indicating whether the first bypass valve (e.g. 263*a*) is open or closed, and plot 745, indicating whether the second bypass valve (e.g. 263*b*) is open or closed, over time. Timeline 700 further includes plot 750, indicating whether the FTIV is open or closed, over time. Accordingly, it may be understood for the timeline of FIG. 7, the evaporative emissions system includes three canisters, two of which (e.g. first canister 222 and second canister 226) are capable of being bypassed but where the third canister (e.g. 229) is not. In other words, the evaporative emissions system comprises a system such as that depicted at FIG. 3A. Furthermore, while the CVV is not depicted, it may be understood that during the timeline of FIG. 7, the CVV is maintained in a fully open configuration.

At time t0, a vehicle-off event is not indicated (plot 705). In other words, at time t0 the vehicle is in operation being operated via, for example, a vehicle operator. It is currently a heat gain portion of the diurnal cycle (plot 710), and the controller is in an awake mode (plot 720). The loading state of both the first canister and the second canister (plot 720 and 725, respectively) are greater than the threshold load (line 726 and line 731, respectively). It may be understood that the threshold load in this particular timeline relates to a loading state of the canister(s) where there is some amount of free activated carbon, whereas there is another amount of the canister that is loaded. As an illustrative example, the threshold load (lines 726 and 731) in this example timeline comprise 60% loaded. The third canister is also loaded to around 60-70% with fuel vapors (plot 735). Furthermore, the first bypass valve, the second bypass valve, and the FTIV are all closed (plots 740, 745 and 750, respectively).

At time t1, a vehicle-off event is indicated. While not explicitly illustrated, it may be understood that in response to the vehicle-off event, forecast weather and temperature data may be retrieved via the controller via one or more of V2X communications, communication with the onboard navigation system and the internet. Accordingly, between time t1 and t2, the controller may determine, based on the forecast weather and temperature data, an inferred time at which point the heat gain portion of the diurnal cycle is expected or predicted to transition from the heat gain portion to a heat loss portion of the diurnal cycle. With the predicted time inferred between time t2, it may be understood that a timer is set, the timer causing the controller to awake from a sleep mode of operation in response to the timer expiring. With the timer set, the controller is slept at time t2.

Between time t2 and t3, the controller is maintained asleep, and at time t3 the timer expires. Upon expiration of the timer, the controller is triggered to the awake mode. As indicated via plots 710 and 715 and 720, the timer expires at a substantially similar time (e.g. within 5-10 minutes) of the diurnal cycle transitioning from the heat gain portion to the heat loss portion.

With the controller awake and with the diurnal cycle being in the heat loss portion, current status of the loading state of each of the first, second and third canisters is updated. As discussed, in this example timeline both the first canister and the second canister are loaded to a level above the threshold load, and the third canister is also at least half way full of fuel vapors. Accordingly, it may be desirable to back purge the third canister directly into the fuel tank, as back purging each of the first, second and third canisters in series may not be efficient and may not result in fuel vapors actually being displaced to the fuel tank, but instead being simply desorbed to another downstream canister. Thus, between time t3 and t4 the controller selects the third canister for direct back purging into the fuel tank based on the loading states of each of the first canister, second canister and third canister. Furthermore, while not explicitly illustrated, in this example timeline no restrictions have been found, via the diagnostic of FIG. 4 for example, and thus the controller does not factor into the selection of which canister to purge based on a presence of a restriction, however such methodology is within the scope of this disclosure as discussed with regard to FIG. 6 above.

With the third canister selected for direct back purging to the fuel tank, at time t4 the FTIV is commanded open, and both the first bypass valve and the second bypass valve are also commanded open. As discussed, while not explicitly illustrated it may be understood that the CVV is open at time t4, and the CPV (e.g. 261) is closed. With the FTIV open, as well as the first bypass valve and the second bypass valve, it may be understood that there is a direct path for fuel vapors being desorbed from the third canister to the fuel tank, without having to be routed through any other downstream canisters (e.g. first canister and/or second canister).

With the FTIV, first bypass valve and second bypass valve commanded open at time t4, the controller infers based on the forecast weather data an approximate time at which it is predicted that the diurnal cycle will transition from the heat loss portion of the diurnal cycle to the heat gain portion of the diurnal cycle. While not explicitly illustrated, it may be understood that the timer is once again set such that the controller may awake at the approximate time of predicted transition from the heat loss portion to the heat gain portion. With the timer set and with the FTIV, first bypass valve and second bypass valve commanded open, at time t5 the controller is returned to the sleep mode.

Between time t5 and t6, during the heat loss portion of the diurnal cycle, as vacuum develops in the fuel tank the fuel vapors stored in the third canister are purged to the fuel tank (plot 735), while the loading state of both the first canister and the second canister remain essentially unchanged (plots 725 and 730, respectively). If the third canister were not purged directly to the fuel tank, fuel vapors desorbed from the third canister may wind up getting re-adsorbed by the free activated carbon in the first and/or second canister. Then, during a subsequent heat gain portion the vapors may again migrate to the third canister, defeating the purpose or reducing effectiveness of back purging during the heat loss portion.

At time t6, the controller is awoken, however the controller is not awoken due to the timer expiring, as the diurnal cycle is still in the heat loss portion (plot 715). Thus, it may be understood that in this example timeline 700, the controller is awoken in response to the vehicle operator opening a door of the vehicle and occupying the vehicle, for example. Accordingly, at time t7, vehicle operation is requested via the operator, which may include a key-on event for example. In response to the request for vehicle operation, the FTIV, first bypass valve and second bypass valve are commanded closed. After time t7, the vehicle is driven according to driver demand.

While the example methodology discussed above with regard to FIG. 6 and as depicted by the timeline of FIG. 7 pertains to back purging of one or more fuel vapor storage canisters to the fuel tank, in other examples engine vacuum during engine operation may be used to purge the one or more canisters. There may be certain vehicle operating conditions where it may be desirable to, rather than purge multiple canisters in series, to instead select particular canister(s) to purge, and bypass other canisters. Accordingly, turning now to FIG. 8, an example method 800 for controlling canister purging events for a multi-canister evaporative emissions system via the use of engine vacuum, is depicted.

Method 800 will be described with reference to the systems described herein and shown in FIGS. 1-3B, though it will be appreciated that similar methods may be applied to other systems without departing from the scope of this disclosure. Instructions for carrying out method 800 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-3B. The controller may employ actuators such as FTIV (e.g. 252), CVV (e.g. 297), first bypass valve (e.g. 263*a*), second bypass valve (e.g. 263*b*), third bypass valve (e.g. 263*c*), etc., to alter states of devices in the physical world according to the methods depicted below.

Method 800 begins at 805 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing to 810, method 800 may include indicating whether engine-on purging conditions are met. Conditions being met may include an indication of a canister load in one or more canisters above a threshold load (e.g. 50% full, 60% full, 70% full, 80% full, 90% full, etc.). Conditions being met at 810 may additionally or alternatively include an indication that the engine is in operation, combusting air and fuel, and that there is a vacuum (e.g. negative pressure with respect to atmospheric pressure) in the intake manifold. Conditions being met at 810 may in some examples include an indication that a temperature of the exhaust catalyst (e.g. 270) is greater than a threshold temperature (e.g. light-off temperature). Conditions being met at 810 may in some examples include an indication that the CVV is not restricted to an extent (e.g. stuck closed) that may adversely impact the purging operation. Said another way, conditions being met at 810 may include an indication that any determined restrictions in the evaporative emissions system may be capable of being bypassed during purging so as not to adversely impact the purging operation.

If, at 810 conditions are not indicated to be met, method 800 may proceed to 815. At 815, method 800 may include maintaining current vehicle operating conditions. For example, if the engine is not in operation, but rather the vehicle is operating via electrical energy, such operation may continue. Current positioning of various valves (e.g. FTIV, CVV, CPV, first bypass valve, second bypass valve, third bypass valve, etc.) may be maintained. Method 800 may then end.

Returning to 810, in response to engine-on purging conditions being met, method 800 may proceed to 820. At 820, method 800 may include indicating whether conditions are met for purging selected canister(s). In other words, step 820 may include determining whether conditions are met for selecting one or more canister(s) to purge, rather than simply purging all canisters in the evaporative emissions system in series. Conditions being met for purging selected canister(s) may in one example include an indication of a restricted canister, the restriction inferred for example via the methodology of FIG. 4. For example, if the first canister (e.g. 222) has been determined to be restricted, then conditions may be met for selecting either to purge the second canister (e.g. 226) or the third canister (e.g. 229), depending on loading state(s) of the second and third canister. Along similar lines, if the second canister and/or third canister has been inferred to be restricted to a point where purging may be adversely impacted, then conditions may be met at 820 for selecting a canister or canister(s) to purge (e.g. first canister).

Other than an indication of a restriction, there may be other vehicle operating parameters for which it may be desirable to select particular canister(s) for purging. In one example, if intake manifold vacuum is not greater than a first intake manifold vacuum threshold, but is greater than a second intake manifold vacuum threshold where the first intake manifold vacuum threshold is greater than the second intake manifold vacuum threshold, then conditions may be indicated to be met for purging a selected canister. For example, intake manifold vacuum greater than the first threshold may comprise a vacuum sufficient for purging the canisters of a multi-canister evaporative emissions system in series, but purging the canisters in series when intake manifold vacuum is not greater than the first intake manifold vacuum threshold may not be efficient or effective. Instead, when intake manifold vacuum is indicated to be below the first intake manifold vacuum threshold but greater than the second intake manifold vacuum threshold, it may be preferable to purge a single canister at a time, so as to ensure at least one canister can be substantially cleaned of fuel vapors. Then, in response to the canister being cleaned, if conditions are still met for purging then another canister may be selected for purging, as will be elaborated in further detail below.

In yet another example, the route being currently traveled via the vehicle as inferred, for example via the onboard navigation system, V2X communications, learned driving routines stored at the controller, etc., may be used as a basis for determining whether conditions are met for purging a selected canister or canisters. For example, based on current vehicle speed and expected or predicted travel route, the controller may infer a duration whereby intake manifold vacuum sufficient for purging a canister or canisters may be maintained. For example, based on the predicted or inferred route, it may be determined that in a particular amount of time a tip-in event is expected or predicted, which may reduce the amount of intake manifold vacuum available for purging. Such methodology may take into account current traffic conditions, for such determination, in some examples. In other examples, the predicted or inferred route may include an expected vehicle-off event within a time frame that may not allow for all of the canisters to be purged until substantially clean by the time the vehicle is turned off.

If, at 820, conditions are not indicated to be met for purging a selected canister or canisters, method 800 may proceed to 825. At 825, method 800 may include purging the canisters in series. Purging the canisters in series at 825 may include commanding or maintaining each of the bypass valves (e.g. 263a, 263b, 263c in the case of a system such as that depicted at FIG. 3B) closed, commanding open the CPV and commanding open or maintaining open the CVV. The FTIV may be maintained/commanded closed for purging at 825.

With the canisters being purged in series at 825, method 800 may proceed to 830. Step 830 is depicted as a dashed box to illustrate that in some examples, step 830 may be conducted whereas in other examples step 830 may not be conducted during purging without departing from the scope of this disclosure. Step 830 includes controlling bypass valve(s) during purging of the canisters in series as a function of canister loading state. Specifically, as an illustrative example, in a case where the evaporative emissions system includes three canisters as depicted at FIG. 3B, during purging canister loading state may be monitored via, for example, the canister temperature sensor(s) positioned in each of the canisters. It may be understood that for such a system, the canister closest to atmosphere along the vent line (e.g. third canister 229) may be the first to receive fresh air flow in response to initiation of purging, and thus may be the first to become cleaned of fuel vapors. Thus, in such an example, in response to the third canister becoming clean, the third bypass valve (e.g. 263c, where included) may be commanded open so as to bypass the third canister, which may improve fresh air flow to the remaining canisters which may improve effectiveness of the purging of the remaining canisters. In similar fashion, in response to the second canister becoming clean, the second bypass valve (e.g. 263b) may be commanded open while maintaining open the third bypass valve, so as to route the fresh air flow around each of the clean canisters and direct the fresh air flow to the first canister. In this way, purging operations for canisters in series may be made to be more efficient and may reduce a time frame for conducting the purging operation.

Proceeding to 835, method 800 may include indicating whether conditions are met for discontinuing the purging operation. Conditions may be met for discontinuing purging in response to an indication that each of the canisters being purged in series are substantially clean (e.g. loaded to less than 5% with fuel vapors). Conditions being met in other examples may include an indication that conditions have changed such that conditions are no longer met for purging. For example, a significant change in intake manifold pressures may result in conditions being met for discontinuing the purging operation. In some examples, a vehicle off event may comprise a condition which may result in discontinuation of purging. If conditions are not met for discontinuing purging at 835, method 800 may return to 825. At 825, method 800 may include continuing the purge the canisters as discussed above.

Alternatively, in response to conditions being met for discontinuing purging at 835, method 800 may proceed to 840. At 840, method 800 may include discontinuing the purging operation. Discontinuing purging may include commanding closed the CPV, for example. Proceeding to 845, method 800 may include updating vehicle operating parameters. Updating vehicle operating parameters may include updating the current loading state of each of the canisters, based on the purging event. Updating vehicle operating parameters may further include commanding any open bypass valves closed. Method 800 may then end.

Returning to 820, in response to conditions being indicated to be met for purging selected canisters, method 800 may proceed to 850. At 850, method 800 may include selecting a canister or canister(s) for purging. For example, as discussed briefly above, for a system such at that depicted at FIG. 3B, in a case where there is a restriction in the second canister (e.g. 226), and where intake manifold vacuum is sufficient (e.g. above the first threshold) for purging canisters in series, then the selected canisters for purging may comprise the first canister and the third canister. In other examples where, for example, the third canister is clean and the first two canisters are saturated but where intake manifold vacuum is not sufficient for purging canisters in series (e.g. below the first threshold but greater than the second threshold), then the second canister may be selected for purging, while both the first canister and the third canister (where possible) may be bypassed. As another representative example, in a case where all three canisters are saturated but where intake manifold is below the first threshold but greater than the second threshold, the third canister may be selected for purging, while the first and second canisters may be bypassed.

It may be understood that the above examples are meant to be illustrative, and any number of scenarios for selectively purging one or more canisters while bypassing other canister(s) are within the scope of this disclosure.

With the canister or canisters selected at 850, method 800 may proceed to 855. At 855, method 800 may include controlling appropriate bypass valves as a function of the canister or canisters selected. As one representative example with regard to the system of FIG. 3B, where the second canister is selected for purging, the third bypass valve (e.g. 263c, where included) may be commanded open, and the first bypass valve (e.g. 263a) may be commanded open. In this way, fresh air flow may be directed at the second canister and fuel vapors desorbed from the second canister may be routed to the engine in a manner that bypasses the first canister.

Proceeding to 860, with the bypass valve(s) configured based on the selected canister(s) for purging, method 800 may include initiating purging of the selected canister(s). Specifically, the CPV may be commanded open, and the CVV may be maintained open to direct engine vacuum at the selected canister(s).

Proceeding to 865, method 800 may include controlling the bypass valve(s) as a function of canister loading state. Again, similar to step 830 discussed above, step 865 is depicted as a dashed box, because in some examples step 865 may be included whereas in other examples step 865 may not be included, without departing from the scope of this disclosure. In an example where step 865 is included, a loading state of the selected canister closest to atmosphere may be monitored during the purging. In response to the selected canister closest to atmosphere being indicated to be clean, if there are other canisters downstream of the selected canister that are loaded and provided conditions are still met for purging, the bypass valve(s) may be controlled so as to bypass clean canister(s) and instead begin purging of loaded canisters similar to that discussed above.

Proceeding to 870, method 800 may include indicating whether conditions are met for discontinuing purging, similar to that discussed above with regard to step 835. If not, method 800 may continue to purge selected canisters and may in some examples control one or more bypass valve(s) as a function of canister loading state during the purging operation. Alternatively, in response to conditions no longer being indicated to be met for purging, method 800 may proceed to 875. At 875, method 800 may include discontinuing the purging operation, by commanding closed the CPV. Continuing at 880, method 800 may include updating vehicle operating parameters. Updating vehicle operating parameters at 880 may include updating the loading state of each individual canister, as a function of the purging operation. Updating vehicle operating parameters at 880 may further include commanding closed any bypass valves that are open. Updating vehicle operating parameters may further include maintaining open the CVV. Method 800 may then end.

In this way, refueling events and canister purging events may efficiently be conducted even under circumstances where a restriction is identified in an evaporative emissions system. For example, in response to identifying a restriction in a canister during a refueling event, the canister with the identified restriction may be bypassed to enable refueling, thereby improving customer satisfaction. Furthermore, canister purging events may be adversely impacted by canister restrictions, and thus bypassing a canister restriction to enable a purging operation may serve to reduce release of undesired evaporative emissions to atmosphere.

The technical effect of conducting an evaporative emissions diagnostic by relying a pressure rise time to a premature shutoff event is that a location of a restriction in an evaporative emissions system can be effectively identified. By effectively identifying a restriction location, mitigating action may be taken in some examples, which may enable the restriction to be bypassed, which as discussed may in turn enable refueling operations and/or canister purging operations to be effectively conducted. Without specific knowledge of restriction location, such bypassing may not otherwise be possible.

The systems and methods discussed herein may enable one or more systems and one or more methods. In one example, a method comprises diagnosing an evaporative emissions system including identifying a location of degradation in an evaporative emissions system of a vehicle based on a rise time at which a pressure in a fuel system of the vehicle rises to a threshold pressure during a refueling event where fuel is added to the fuel system via a refueling dispenser. A first example of the method optionally includes wherein the threshold pressure is a pressure at which an automatic shutoff of the refueling dispenser is triggered. A second example of the method optionally includes the first example, and further includes wherein diagnosing the evaporative emissions system includes fluidically coupling the fuel system to the evaporative emissions system, and fluidically coupling the evaporative emissions system to atmosphere. A third example of the method optionally includes any one or more or each of the first through second examples, and further includes wherein the degradation comprises a restriction in the evaporative emissions system; and wherein the location of the restriction is related to the rise time. A fourth example of the method optionally includes any one or more or each of the first through third examples, and further comprises inferring a dispense rate at which the fuel is added to the fuel system via the refueling dispenser; and normalizing the rise time based on the dispense rate to identify the location of degradation. A fifth example of the method optionally includes any one or more or each of the first through fourth examples, and further comprises monitoring a fuel level change in the fuel system during the refueling event; and wherein the dispense rate is inferred based on the fuel level change as a function of time.

A sixth example of the method optionally includes any one or more or each of the first through fifth examples, and further includes wherein the dispense rate is retrieved via V2X communications, including wireless communication between a controller of the vehicle and one or more other vehicles, and/or communication between the controller of the vehicle and a refueling station at which fuel is added to the fuel system via the refueling dispenser. A seventh example of the method optionally includes any one or more or each of the first through sixth examples, and further includes wherein diagnosing the evaporative emissions system includes comparing the rise time to a set of predetermined baseline rise times corresponding to various degradation locations in the evaporative emissions system in order to identify the location of degradation. An eighth example of the method optionally includes any one or more or each of the first through seventh examples, and further comprises actuating a valve to bypass the location of degradation in response to the evaporative emissions system diagnostic identifying the location of degradation. A ninth example of the method optionally includes any one or more or each of the first through eighth examples, and further comprises controlling a purging event of one or more fuel vapor storage canisters positioned in the evaporative emissions system based on the location of degradation identified via the evaporative emissions system diagnostic.

Another example of a method comprises conducting an evaporative emissions system diagnostic to identify a location of a restriction in an evaporative emissions system of a vehicle based on a pressure rise time between a first time at which fuel is commenced being added to a fuel system of the vehicle via a refueling dispenser and a second time corresponding to a premature shutoff of the refueling dispenser; and controlling a valve positioned in the evaporative emissions system in response to the identified location of the restriction. In a first example of the method, the method optionally includes wherein the pressure rise time is monitored via a fuel tank pressure transducer; and wherein the pressure rise time is adjusted based on an inferred rate at which fuel is being added to the fuel system via the refueling dispenser. A second example of the method optionally includes the first example, and further includes wherein the premature shutoff of the refueling dispenser occurs as a result of the restriction impeding a fluid flow between the fuel system and atmosphere while fuel is being added to the fuel system. A third example of the method optionally includes any one or more or each of the first through second examples, and further includes wherein the pressure rise time is compared to a set of predetermined pressure rise times corresponding to a plurality of restriction locations to determine the location of the restriction. A fourth example of the method optionally includes any one or more or each of the first through third examples, and further includes wherein controlling the valve includes commanding open the valve in order to bypass the location of the restriction to enable fuel to continue being added to the fuel system without inducing another premature shutoff of the refueling dispenser.

An example of a system for a vehicle comprises an evaporative emissions system fluidically coupled to a fuel system that includes a fuel tank, the evaporative emissions system including two or more fuel vapor storage canisters; a fuel tank pressure transducer and a fuel level indicator coupled to the fuel tank; and a controller with computer readable instructions stored on non-transitory memory that when executed during a refueling event of the fuel system, cause the controller to: monitor a rise time of a pressure via the fuel tank pressure transducer between a first time point when a fuel level in the fuel tank begins rising and a second time point when the fuel level in the fuel tank prematurely stops rising prior to the fuel level reaching a capacity of the fuel tank, the fuel level monitored via the fuel level indicator; compare the rise time to a set of baseline rise times; indicate a location of a restriction in the evaporative emissions system based on comparing the rise time to the set of baseline rise times; and responsive to the location of the restriction comprising a fuel vapor storage canister, route a fluid flow around the fuel vapor storage canister. In a first example of the system, the system further includes wherein the controller is communicably coupled to a wireless network; and wherein the controller stores further instructions to send a wireless request pertaining to a fuel dispense rate of a refueling dispenser that is adding fuel to the fuel tank during the refueling event, to a refueling system that includes the refueling dispenser; receive the fuel dispense rate from the refueling system; and normalize the rise time of the pressure as a function of the fuel dispense rate. A second example of the system optionally includes the first example, and further includes wherein the controller stores further instructions to, in response to an indication that the refueling system cannot provide the fuel dispense rate, monitor a fuel level rise rate via the fuel level sensor over a predetermined period of time to infer the fuel dispense rate; and normalize the rise time of the pressure based on the fuel dispense rate inferred from the fuel level rise rate. A third example of the system optionally includes the second example, and further comprises one or more canister bypass valves; and wherein the controller stores further instructions to command open a canister bypass valve to route the fluid flow around the location of the restriction. A fourth example of the system optionally includes any one or more or each of the first through third examples, and further includes wherein the controller stores further instructions to conduct a purging operation of the two or more canisters of fuel vapors subsequent to the refueling event; and wherein the controller stores further instructions to command open the canister bypass valve to conduct the purging operation.

In another representation, a method comprises, in a first condition, purging a multi-canister evaporative emissions system in series, and in a second condition, purging a selected canister of the multi-canister evaporative emissions system, where said purging is conducted during engine operation. The first condition may include an intake manifold vacuum greater than a first threshold vacuum, and the second condition may include the intake manifold vacuum lower than the first threshold vacuum but greater than a second threshold vacuum.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   diagnosing an evaporative emissions system including identifying a location of degradation in an evaporative emissions system of a vehicle based on a rise time at which a pressure in a fuel system of the vehicle rises to a threshold pressure during a refueling event where fuel is added to the fuel system via a refueling dispenser; and
   actuating a valve to bypass the location of degradation in response to the evaporative emissions system diagnostic identifying the location of degradation.

2. The method of claim 1, wherein the threshold pressure is a pressure at which an automatic shutoff of the refueling dispenser is triggered.

3. The method of claim 1, wherein diagnosing the evaporative emissions system includes fluidically coupling the fuel system to the evaporative emissions system, and fluidically coupling the evaporative emissions system to atmosphere.

4. The method of claim 1, wherein the degradation comprises a restriction in the evaporative emissions system; and
   wherein the location of the restriction is related to the rise time.

5. The method of claim 1, further comprising inferring a dispense rate at which the fuel is added to the fuel system via the refueling dispenser; and
   normalizing the rise time based on the dispense rate to identify the location of degradation.

6. The method of claim 5, further comprising monitoring a fuel level change in the fuel system during the refueling event; and wherein the dispense rate is inferred based on the fuel level change as a function of time.

7. The method of claim 5, wherein the dispense rate is retrieved via V2X communications, including wireless communication between a controller of the vehicle and one or more other vehicles, and/or communication between the controller of the vehicle and a refueling station at which fuel is added to the fuel system via the refueling dispenser.

8. The method of claim 1, wherein diagnosing the evaporative emissions system includes comparing the rise time to a set of predetermined baseline rise times corresponding to various degradation locations in the evaporative emissions system in order to identify the location of degradation.

9. The method of claim 1, further comprising controlling a purging event of one or more fuel vapor storage canisters positioned in the evaporative emissions system based on the location of degradation identified via the evaporative emissions system diagnostic.

10. A method comprising:

conducting an evaporative emissions system diagnostic to identify a location of a restriction in an evaporative emissions system of a vehicle based on a pressure rise time between a first time at which fuel is commenced being added to a fuel system of the vehicle via a refueling dispenser and a second time corresponding to a premature shutoff of the refueling dispenser; and controlling a valve positioned in the evaporative emissions system in response to the identified location of the restriction, wherein controlling the valve includes commanding open the valve in order to bypass the location of the restriction to enable fuel to continue being added to the fuel system without inducing another premature shutoff of the refueling dispenser.

11. The method of claim 10, wherein the pressure rise time is monitored via a fuel tank pressure transducer; and wherein the pressure rise time is adjusted based on an inferred rate at which fuel is being added to the fuel system via the refueling dispenser.

12. The method of claim 10, wherein the premature shutoff of the refueling dispenser occurs as a result of the restriction impeding a fluid flow between the fuel system and atmosphere while fuel is being added to the fuel system.

13. The method of claim 10, wherein the pressure rise time is compared to a set of predetermined pressure rise times corresponding to a plurality of restriction locations to determine the location of the restriction.

* * * * *